US008235110B2

(12) United States Patent
Larter et al.

(10) Patent No.: US 8,235,110 B2
(45) Date of Patent: Aug. 7, 2012

(54) PRECONDITIONING AN OILFIELD RESERVOIR

(75) Inventors: Stephen Richard Larter, Calgary (CA); Ian Donald Gates, Calgary (CA); Jennifer Jane Adams, Calgary (CA); Chunqing Jiang, Calgary (CA); Lloyd Ross Snowdon, Calgary (CA); Barry Bennett, Calgary (CA); Haiping Huang, Calgary (CA)

(73) Assignee: Gushor Inc., Calgary, Alberta ( * ) Notice: Subject to any disclaimer, the term of this patent is extended or adjusted under 35 U.S.C. 154(b) by 232 days.

(21) Appl. No.: 12/519,131

(22) PCT Filed: Dec. 12, 2007

(86) PCT No.: PCT/CA2007/002249
§ 371 (c)(1),
(2), (4) Date: Jun. 12, 2009

(87) PCT Pub. No.: WO2008/070990
PCT Pub. Date: Jun. 19, 2008

(65) Prior Publication Data
US 2010/0012331 A1    Jan. 21, 2010

Related U.S. Application Data

(60) Provisional application No. 60/869,886, filed on Dec. 13, 2006, provisional application No. 60/869,888, filed on Dec. 13, 2006.

(51) Int. Cl.
*E21B 33/138* (2006.01)
*E21B 43/22* (2006.01)
*E21B 43/24* (2006.01)
*E21B 47/00* (2012.01)
*E21B 47/10* (2012.01)

(52) U.S. Cl. .................. 166/250.01; 166/263; 166/270; 166/272.1; 166/272.3; 166/275; 166/294; 166/300; 166/303; 166/305.1; 166/400; 507/260; 507/261; 507/267; 507/268

(58) Field of Classification Search ................... 166/400
See application file for complete search history.

(56) References Cited

U.S. PATENT DOCUMENTS

| | | | | | |
|---|---|---|---|---|---|
| 2,875,831 | A | * | 3/1959 | Martin et al. | 166/266 |
| 3,033,288 | A | * | 5/1962 | Holm | 166/400 |
| 3,135,326 | A | * | 6/1964 | Santee | 166/270.1 |
| 3,203,480 | A | * | 8/1965 | Froning | 166/252.1 |
| 3,241,614 | A | * | 3/1966 | Bertness | 166/304 |
| 3,330,345 | A | * | 7/1967 | Henderson et al. | 166/400 |
| 3,454,095 | A | * | 7/1969 | Webster et al. | 166/303 |
| 3,500,932 | A | * | 3/1970 | Webb | 166/308.4 |
| 3,502,147 | A | * | 3/1970 | Hill et al. | 166/270.1 |
| 3,710,861 | A |   | 1/1973 | Ver Steeg | |
| 3,823,777 | A | * | 7/1974 | Allen et al. | 166/266 |

(Continued)

OTHER PUBLICATIONS

International Search Report and Written Opinion of the International Searching Authority, PCT Application Serial No. PCT/CA2007/002249, Mar. 17, 2008, 10 pp.

(Continued)

*Primary Examiner* — George Suchfield
(74) *Attorney, Agent, or Firm* — Fish & Richardson P.C.

(57) ABSTRACT

Techniques for preconditioning an oilfield reservoir including heavy oil and/or bitumen prior to production of a petroleum product are described. A preconditioning agent can be injected into a mobile water film included in the oilfield reservoir. The preconditioning agent preconditions the reservoir prior to production of the petroleum product.

89 Claims, 12 Drawing Sheets

U.S. PATENT DOCUMENTS

| | | | |
|---|---|---|---|
| 3,902,557 A * | 9/1975 | Shaughnessy et al. | 166/295 |
| 3,949,220 A * | 4/1976 | Sparlin et al. | 250/260 |
| 3,997,004 A | 12/1976 | Wu | |
| 4,004,636 A * | 1/1977 | Brown et al. | 166/401 |
| 4,068,715 A | 1/1978 | Wu | |
| 4,158,638 A * | 6/1979 | Tsai | 208/426 |
| 4,260,019 A * | 4/1981 | Blair, Jr. | 166/400 |
| 4,372,381 A | 2/1983 | McMillen et al. | |
| 4,487,262 A * | 12/1984 | Venkatesan et al. | 166/271 |
| 4,838,350 A | 6/1989 | McCoy et al. | |
| 6,277,296 B1 * | 8/2001 | Scheffee et al. | 252/5 |
| 2006/0084580 A1 * | 4/2006 | Santra et al. | 507/239 |

OTHER PUBLICATIONS

Office Action mailed Aug. 31, 2011 in corresponding Canadian patent application No. 2,672,487 (5 pages).

Office Action mailed Mar. 5, 2012 in corresponding Chinese application No. 200780051254.4 (3 page English translation).

* cited by examiner

PRECONDITIONING AN OILFIELD RESERVOIR

CROSS REFERENCE TO RELATED APPLICATIONS

This application claims priority to pending U.S. Provisional Patent Application Ser. No. 60/869,886 filed Dec. 13, 2006, and entitled "Bulk Reservoir Upgrading Through Utilisation of Slow Minority Phase Reagent-Carrying Fluid Floods," and to pending U.S. Provisional Patent Application Ser. No. 60/869,888 filed Dec. 13, 2006, and entitled "Hydrate Process for Enhanced Recovery of Heavy Oil and Tar Sand Bitumen from Reservoirs", the entire contents of both of which are incorporated herein by reference.

TECHNICAL FIELD

This invention relates to enhanced recovery of petroleum products.

BACKGROUND

Currently, in situ technologies are used to extract heavy oil or bitumen from oil sands deposits at depths greater than about 70 meters. Surface mining these deposits is not economical. Depending on the particular process used and the operating conditions, in situ processes can produce between approximately 10% and 60% of the original volume of oil in place. The produced oil typically consists of solution gas and low API (American Petroleum Institute) gravity oil, having a viscosity greater than approximately 1000 cP (centipoise) at surface conditions. Heavy oil or bitumen is produced to the surface and is often diluted with a solvent (e.g., a diluent or gas condensate) to facilitate piping the product to a surface facility, such as a heavy oil upgrader for upgrading and conversion into a synthetic crude oil. Synthetic crude oil is a value-added product that can be used in conventional crude refineries for conversion to gasoline, kerosene and other petrochemical products.

Conventional upgrading occurs in a refinery at surface and can use processes such as visbreaking, thermal cracking, or catalytic processes such as hydrocracking and hydrotreating to reduce the average molecular weight of an oil, increase the hydrogen content, reduce the sulphur and nitrogen contents and tailor the composition of the oil to a desired product stream. Similar approaches have been suggested for upgrading in a reservoir whereby catalysts and a recovery process are combined to effect these beneficial changes in the reservoir itself. Examples include the THAI process, an acronym for "toe-to-heel air injection", and the CAPRI process, a version of THAI that uses catalyst.

Conventional techniques to recover heavy oil or bitumen are generally either thermal or non-thermal processes. Cyclic Steam Stimulation (CSS) is an example of a thermal recovery process. In a first stage of the process, a volume of high pressure steam is injected through an injection well into an oil sands formation to heat the bitumen. The steam is generally injected at pressures above the fracture pressure of the reservoir, so a steam fracture is formed in the reservoir during injection. In a second optional stage, the reservoir is allowed to "soak", during which the steam condenses and releases its latent heat to the formation thus further heating the oil sands. In a third stage, the injection well is switched to a production well and reservoir fluids including steam, condensed steam, mobile bitumen, and gas are produced to the surface. The production stage continues while economic rates of bitumen recovery are achieved. After the bitumen rate becomes too small for the process to be economic, the well is switched to injection and the first stage starts again. The stages are repeated for as many cycles as the process is economic. The CSS method relies on formation recompaction, solution gas drive, and gravity drainage as the major drive mechanisms for heavy oil and bitumen recovery. The major costs associated with CSS are steam generation, water handling and treatment, and recycling.

Another example of a thermal recovery process is Steam Assisted Gravity Drainage (SAGD). Typically, two horizontal wells are drilled substantially parallel to each other in a heavy oil or bitumen reservoir, with one well positioned vertically above the second well. The upper well is the injection well and the lower well is the production well. Steam is injected through the upper well and forms a vapor phase chamber that grows within the reservoir. The injected steam reaches the edges of the depletion steam chamber and delivers latent heat to the surrounding oil sand. The oil within the oil sand is heated and consequently its viscosity decreases. The oil drains under the action of gravity within and along the edges of the steam chamber toward the production well. The reservoir fluids, i.e., the heated oil and condensate, enter the production well and are motivated, either by natural pressure or by a pump, to the surface. In the initial stages of the process, the steam chamber grows vertically. After the chamber reaches the top of the reservoir, it may grow laterally, however, heat from the steam can be lost to shale and other material found at the upper boundary of the oil-rich zone in the reservoir. Generally, the major capital and operating costs of SAGD are tied to the steam generation and water handling, treatment, and recycling facilities.

A variant of SAGD is the Steam and Gas Push (SAGP) process. In SAGP, steam and a non-condensable gas are co-injected into the reservoir, and the non-condensable gas forms an insulating layer at the top of the steam chamber. This can lower heat losses to the cap rock and improve the thermal efficiency of the recovery process. The well configuration is the same as the standard SAGD configuration. There are other examples of processes that use steam with different well configurations to recover heavy oil and bitumen.

A non-thermal process is referred to as Cold Production (CP). In CP techniques, the live oil viscosity (i.e., the viscosity of oil with associated solution gas) is typically low enough and the driving pressure gradient due to solution-gas drive, large enough that the oil together with gas bubbles and possibly reservoir matrix material (e.g., sand or silt) can be produced to the surface. The oil is often produced as a foamy oil phase with gas bubbles evolving from the viscous oil matrix.

Vapor Extraction (VAPEX) is another non-thermal recovery technique that involves injecting vaporized solvents into heavy oil deposits. The injected solvent enters a vapor chamber and flows to the chamber edges. At the edges, the solvent condenses and mixes with the oil, diluting it and lowering its viscosity so that it can flow under the action of gravity drainage to a production well. Similar to SAGD, the production well is positioned below the injection well and the vapor-chamber that is created above the injection well.

SUMMARY

This invention relates to enhanced recovery of petroleum products. In general, in one aspect, the invention features a method for enhancing recovery of a petroleum product from an oilfield reservoir that includes at least one of heavy oil or bitumen. Water including a preconditioning agent is injected into a mobile water film within the oilfield reservoir. The oilfield reservoir is preconditioned with the preconditioning agent prior to production of the petroleum product from the oilfield reservoir.

Implementations of the invention can include one or more of the following features. The water including the preconditioning agent can be injected into an oil-rich zone in the reservoir. The water including the preconditioning agent can be injected at a pressure low enough so that the heavy oil or bitumen is substantially unmoved by the injected water. The preconditioning agent can be allowed a defined period of time to permeate and react within the oil-rich zone prior to production. The water including the preconditioning agent can be injected at a first location through a first well, and water can be produced from the reservoir at a second location from a second well to urge movement of the preconditioning agent in a direction from the first location toward the second location. After preconditioning the reservoir, the petroleum product can be recovered from the reservoir by using cold production or a thermal recovery process, or both.

Preconditioning the oilfield reservoir can include modifying the viscosity of the oil in the reservoir, and in one example the preconditioning agent is an organic solvent having moderate water solubility. Examples of agents include methyl ethyl ketone, methyl propyl ketone and methyl tertiary-butyl ether.

Preconditioning the oilfield reservoir can include enlivening the heavy oil or bitumen with solution gas. The preconditioning agent can be a water soluble agent that decomposes under recovery process conditions to produce a gas. In one example, the preconditioning agent is citric acid and the recovery process conditions are thermal recovery conditions. In one implementation, injecting water including a preconditioning agent includes injecting a first water solution including a carboxylic acid, and injecting a second water solution including a water soluble carbonate mineral.

Preconditioning the oilfield reservoir can include creating a barrier layer within the reservoir. The barrier layer can be a highly viscous oil barrier layer situated to restrict an interface between the oil-rich zone and a water zone. In one example, the preconditioning agent is an alkylphenol agent selected to promote wettability change in part of the reservoir. In another example, the preconditioning agent contains metal ions or a multidentate ligand organic compound selected to facilitate binding of non-hydrocarbons. In yet another example, the preconditioning agent is a soluble calcium salt selected to form calcium naphthenates with oil in the reservoir.

Preconditioning the oilfield reservoir can include modifying wettability of the reservoir from a water wet to an oil wet reservoir. The preconditioning agent can be a water soluble agent that can sorb to a mineral surface by a functional group and/or can be a water soluble agent including a hydrophobic component that can rupture a mineral bound water film. In one example, the preconditioning agent is a phenol.

Injecting water including a preconditioning agent into a mobile water film can include injecting a first water solution including a first preconditioning agent through a first well, and injecting a second water solution including a second preconditioning agent through a second well. The first preconditioning agent reacts in situ with the second preconditioning agent to create a region of reactive component. In one example, the first preconditioning agent is a soluble sulphide rich solution, the second preconditioning agent is a metal rich solution, and the region of reactive component is a region of insoluble metal sulphide creating a barrier restricting fluid flow. In another example, the first preconditioning agent is a water soluble carbonate, the second preconditioning agent is a soluble acid, and the region of reactive component includes carbon dioxide.

Preconditioning the oilfield reservoir can include promoting or demoting a biological process. In one example, preconditioning the oilfield reservoir includes inhibiting sulphate-reducing bacteria and the preconditioning agent is sodium molybdate. In another example, preconditioning the oilfield reservoir includes inhibiting nitrate reducing bacteria and the preconditioning agent is sodium chlorate. In yet another example, preconditioning the oilfield reservoir involves inhibiting methanogens and the preconditioning agent is bromoethane sulfonic acid.

Preconditioning the oilfield reservoir can involve promoting hydrate formation within the reservoir and the preconditioning agent can be a hydrate promoting agent. Example preconditioning agents include methane, ethane, propane, normal butane, iso-butane and carbon dioxide. In one implementation, the preconditioning agent further includes a hydrate inhibitor. The water including the preconditioning agent can be heated prior to injection.

Preconditioning the reservoir can include altering the permeability of the reservoir. In one example, the preconditioning agent is selected to promote carbonate dissolution. In other examples, the preconditioning agent is a dolomitization agent or a de-dolomitization agent. Preconditioning the reservoir can include reducing the permeability of the reservoir and the preconditioning agent can be a clay mineral swelling agent. In another example, preconditioning the reservoir includes maintaining the permeability of the reservoir and the preconditioning agent is a clay mineral stabilizing agent.

Preconditioning the reservoir can include preventing hydrate formation and the preconditioning agent can be a hydrate inhibitor. In another implementation, preconditioning the reservoir can include corroding silicate grains included in the reservoir and the preconditioning agent can be a corrosive agent. In yet another implementation, the preconditioning agent can be a sodium silicate solution selected to promote silicate formation under subsequent thermal recovery conditions and reduce permeability in a region of the reservoir to control water flow.

In some implementations, preconditioning can involve modifying a property of the reservoir. For example, preconditioning can include modifying a magnetic property of the reservoir and the preconditioning agent can have a magnetic property. In another example, preconditioning the reservoir can include modifying an electrical property of the reservoir and the preconditioning agent can be a saline solution selected to increase electrical conductivity of the reservoir. In yet another example, preconditioning the reservoir can include modifying a seismic property of the reservoir.

In some implementations, during a later process to recover the petroleum product, water can be produced from the reservoir and analyzed to determine whether or not the preconditioning agent is present. A location of a steam chamber can be determined based on the analysis. In another example, a location of production along a wellbore can be determined based on the analysis.

Preconditioning the reservoir can include promoting carbon dioxide sequestration and the preconditioning agent can be a calcium-rich brine. Preconditioning the reservoir can include enhancing fracture permeability and the preconditioning agent can be a propping agent. The reservoir can be preconditioned to reduce or eliminate oil-water emulsion formation and the preconditioning agent can be a demulsifying agent. The reservoir can be preconditioned to create a barrier to in situ combustion and the preconditioning agent can be a fire retardant. In another example, preconditioning the reservoir can accelerate in situ combustion for a recovery process and the preconditioning agent can be an oxidant.

In some implementations, the preconditioning agent can be selected to decompose thermally under subsequent thermal recovery conditions to thereby produce a secondary agent. The secondary agent preconditions the reservoir. In one example, the preconditioning agent is oxalic acid that produces a secondary agent of carbon dioxide under steam assisted gravity drainage recovery conditions. In this example, preconditioning the reservoir includes enlivening the heavy oil or bitumen with the carbon dioxide. In another example, the preconditioning agent is a transition metal carboxylate salt of ferric iron that produces a secondary agent of iron oxide under steam assisted gravity drainage recovery conditions. In this example, preconditioning the reservoir includes forming one or more barrier regions within the reservoir.

The preconditioning agent can be a carboxylic acid and preconditioning the reservoir can include reducing clay mobility. In some implementations, the petroleum product then can be produced from the reservoir by surface mining.

In general, in another aspect, the invention features a method for enhancing recovery of a petroleum product from an oilfield reservoir that includes at least one of heavy oil or bitumen. A water solution including a preconditioning agent is injected into a mobile water film included in the oilfield reservoir. The preconditioning agent is allowed to react with one or more components in situ to produce a component of a reaction system from which an active secondary agent is derived. The oilfield reservoir is preconditioned with the active secondary agent prior to production of the petroleum product from the reservoir.

Implementations of the invention can include one or more of the following features. The preconditioning agent can be a water soluble sulphate that undergoes thermochemical sulphate reduction by reacting with hydrocarbons included in the reservoir under thermal recovery conditions to produce a component including sulphide ions. A second water solution including metal ions can be injected into the mobile water film of the reservoir. The metal ions can react with the sulphide ions to produce an active secondary agent being a solid metal sulphide phase. Preconditioning the oilfield reservoir with the active secondary agent can include forming one or more barrier regions with the solid metal sulphide phase.

In general, in another aspect, the invention features a system for recovering a petroleum product from a heavy oil or bitumen reservoir. The system includes an injection well drilled to a depth located within an oil-rich zone of the heavy oil or bitumen reservoir and a production well drilled to a lower depth than the injection well and located within the oil-rich zone of the heavy oil or bitumen reservoir. The system further includes a source of a water solution including a preconditioning agent, wherein the injection well is configured to inject the water solution into a mobile water film in the oil-rich zone such that the reservoir is preconditioned with the preconditioning agent prior to production of the petroleum product from the reservoir. The system further includes a source of steam, wherein the injection well is configured to inject steam into the oil-rich zone to create steam assisted gravity drainage (SAGD) recovery conditions after the preconditioning. The production well is configured to produce the petroleum product under SAGD recovery conditions. In another implementation, the source of steam can be used for cyclic steam stimulation (CSS) production, rather than SAGD.

In general, in another aspect, the invention features a method for enhancing recovery of a petroleum product from an oilfield reservoir including at least one of heavy oil or bitumen. A first water solution including a first preconditioning agent is injected into a mobile water film included in the oilfield reservoir at a first depth. A second water solution including a second preconditioning agent is injected into the mobile water film at a second depth. A first zone of the oilfield reservoir is preconditioned with the first preconditioning agent and a second zone of the oilfield reservoir is preconditioned with the second preconditioning agent, prior to production of the petroleum product from the oilfield reservoir.

In general, in another aspect, the invention features a method for enhancing recovery of a petroleum product from an oilfield reservoir that includes at least one of heavy oil or bitumen. A first water solution including a first preconditioning agent is injected into a mobile water film included the oilfield reservoir at a first location. A second water solution including a second preconditioning agent is injected into the mobile water film at a second location. Water is produced from the oilfield reservoir to control movement of the first water solution and the second water solution, such that the first preconditioning agent and the second preconditioning agent can react together in situ and precondition the reservoir prior to production of the petroleum product from the reservoir.

Implementations of the invention can include one or more of the following features. The first and second water solutions can be injected into an oil-rich zone of the reservoir. The first preconditioning agent can be barium chloride, the second preconditioning agent can be sodium sulphate and the two preconditioning agents can react in situ to produce a barium sulphate scale. In another example, the first preconditioning agent can be a soluble sulphide rich solution, the second preconditioning agent can be a metal rich solution and the two preconditioning agents can react in situ to produce a region including insoluble metal sulphide. In yet another example, the first preconditioning agent can be a water soluble carbonate, the second preconditioning agent can be a soluble acid and the two preconditioning agents can react in situ to produce a region including carbon dioxide.

In general, in another aspect, the invention features a method for enhancing recovery of a petroleum product from an oilfield reservoir including at least one of heavy oil or bitumen. Water including a preconditioning agent is injected at a first location into a mobile water zone situated above an oil-rich zone of the oilfield reservoir. Water is produced from the reservoir at a second location to control movement of the preconditioning agent through the water zone and into the nearby oil zone. The reservoir is preconditioned with the preconditioning agent prior to production of the petroleum product from the oilfield reservoir. The preconditioning agent is selected to create a highly viscous oil phase to form near the water zone and preconditioning the reservoir includes creating a barrier layer between the water zone and the oil-rich zone of the reservoir.

In general, in another aspect, the invention features a method of disposing of a pollutant. Water including a water soluble pollutant is injected at low pressure into a mobile water film included in an oilfield reservoir. The oilfield reservoir includes at least one of heavy oil or bitumen. The pollutant is sequestered in the heavy oil or bitumen or maintained in the water film and stored in situ. In one example, pollutant is a radionuclide. The water can be injected into an oil-rich zone of the reservoir.

In general, in another aspect, the invention features a method for enhancing recovery of a petroleum product from an oilfield reservoir. A preconditioning agent is injected into a mobile water film included in the oilfield reservoir. The oilfield reservoir includes at least one of heavy oil or bitumen. The reservoir is preconditioned with the preconditioning agent prior to production of the petroleum product from the oilfield reservoir.

Implementations of the invention can include one or more of the following features. The preconditioning agent can be included in a carrier fluid. One example of a carrier fluid is water. In other examples, the carrier fluid is a water soluble fluid. The preconditioning agent can be injected into an oil-rich zone of the reservoir.

Implementations of the invention can include none or some of the following advantages. The techniques described for preconditioning a heavy oil or bitumen reservoir can increase the recovery factor significantly. In some instances, the heavy oil and bitumen can be produced more economically through improved recovery. Production can also be more economical, for example, as compared to conventional SAGD recovery, due to reduced injection of water, steam or heat and associated reductions in energy costs. Petroleum products can be produced with reduced emission of carbon dioxide and other greenhouse gases that are generally associated with thermal recovery production. Produced petroleum products can have reduced viscosity and/or improved chemical composition. Petroleum products can be recovered from thin pay zones or zones adjacent to water saturated reservoir sections.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Techniques, apparatus and systems for enhancing recovery of a petroleum product from an oilfield reservoir that includes heavy oil and/or bitumen are described. Water that includes a preconditioning agent is injected into the mobile water film of the oilfield reservoir. The oilfield reservoir is preconditioned with the agent prior to production of the petroleum product from the reservoir. Petroleum products may have previously been produced from the reservoir, in which case, the preconditioning occurs prior to attempting to recover any remaining petroleum products within the reservoir. The mobile water film is the mechanism for moving the preconditioning agent into and through the reservoir. The mobile water film exists in an oil rich zone of the heavy oil or bitumen reservoir. In contrast to a conventional waterflood, where the goal is to displace oil toward a production well, water is not injected into the reservoir to displace oil from a water injection well to a production well, but rather to deliver a preconditioning agent to the reservoir at a low enough pressure that the oil remains essentially and largely unmoved. In other implementations, mobile water in top, middle or bottom water zones can be used as a transport mechanism for a preconditioning agent, as shall be described further below.

In other implementations, the carrier fluid can be an appropriate fluid other than water, wherein the preconditioning agent within the carrier fluid is introduced into the mobile water film in the heavy oil or bitumen reservoir, or within a mobile water zone situated elsewhere in the heavy oil or bitumen reservoir. In yet another implementation, the preconditioning agent can be injected directly, i.e., not within a carrier fluid. Although the water or other carrier fluid is generally injected at a low pressure so as not to substantially move the oil, in other implementations, the solution including the preconditioning agent can be injected at a higher pressure that can move the oil and still provide a preconditioning effect prior to production, as described herein.

In most circumstances when the preconditioning method is applied to bitumen and heavy oil reservoirs, the water film is wetting the mineral surfaces and the reservoir is largely or partially water wet. For an oil-wet reservoir, the water sits within the pores as potentially connected water. If the initial water saturation is higher than the irreducible water saturation (the water saturation where the water becomes immobile), then the preconditioning agent can still be seeded in oil-wet reservoirs. The wetting state of the reservoir does not affect the application of the techniques described.

Figure 1:
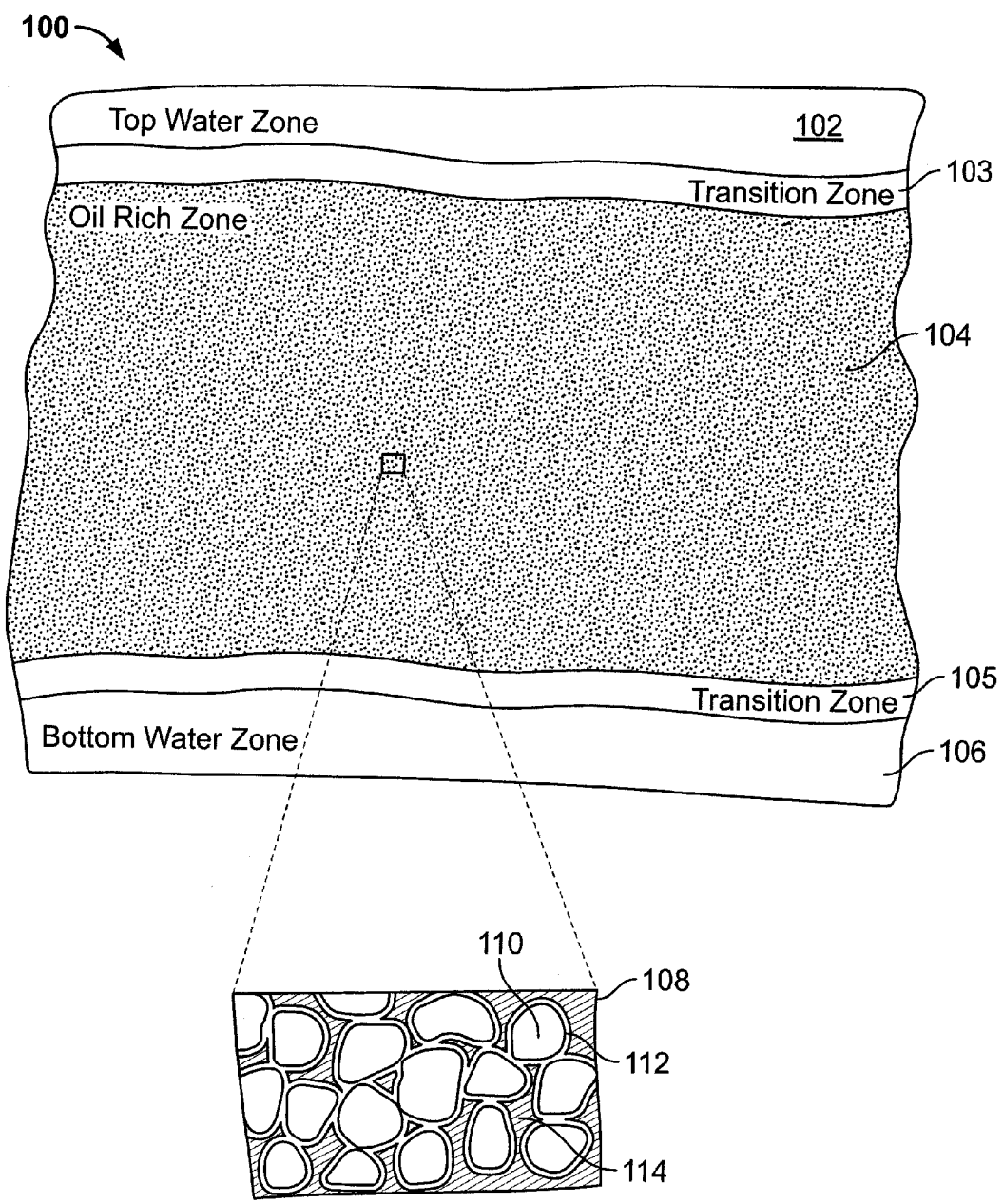
FIG. 1 is a schematic representation of a cross-sectional view of a portion of a heavy oil or bitumen reservoir.

Referring to FIG. 1, a schematic representation of a cross-sectional view of a portion of a water wet oilfield reservoir 100 is shown. The reservoir 100 includes an oil-rich zone 104 of heavy oil and/or bitumen. Heavy oil and bitumen reservoirs generally include mobile interstitial water, referred to herein as the mobile water film. Box 108 shows an enlarged schematic representation of a portion of the oil-rich zone 104, which in this example includes reservoir sand 110, sometimes referred to as oil sand or tar sand. In a water-wet oil sands reservoir as shown, a water film 112 exists coating the surface of the particles of reservoir sand 110. Heavy oil or bitumen 114 exists in the pore space between the reservoir sand 110. An oil-rich zone, as the term is used throughout this application, refers to a zone in a heavy oil or bitumen reservoir in which the pore space contains between only approximately 10 and 30% water by volume. Generally, in the oil-rich zone, the water is contained in the mobile water film.

Heavy oil and bitumen reservoirs can include a top water, middle water and/or bottom water zone. In the example reservoir 100 shown, top and bottom water zones are present; the top water zone 102 is situated above the oil-rich zone 104, and the bottom water zone 106 is situated below. In another example, the reservoir can include a middle water zone present within the oil-rich zone. Generally, a top, middle or bottom water zone refers to a zone having a water saturation of equal to or greater than 50% by volume of the pore space.

For clarity, generally, bitumen is heavy oil having a viscosity greater than approximately 10,000 cP at surface conditions. The term hydrocarbon as used herein refers to a chemically defined component including only hydrogen and carbon. The term non-hydrocarbon refers to a chemically defined component containing one or more heteroatoms such as sulphur, nitrogen or oxygen or one or more metals in addition to hydrogen and carbon. Heavy oil and bitumen are typically rich in both hydrocarbons and non-hydrocarbons. Oil refers to a subsurface liquid petroleum material rich in chemically defined hydrocarbons and non-hydrocarbons that produces a crude oil or bitumen at the surface on production. Petroleum product is used herein to refer to oil and gas, where gas can include methane and hydrogen and other natural gases.

At in situ native temperature and pressure, heavy oil and bitumen have significantly higher viscosity than conventional light oil. When attempting to recover a petroleum product from an oilfield reservoir, viscous forces can dominate and recovery is primarily a function of fluid mobility in the reservoir under production. Fluid mobility is the ratio of the effective permeability of live oil in the reservoir to live oil viscosity (oil or bitumen with solution gas) under reservoir conditions. Effective oil permeability is the product of the relative permeability of the oil phase and the absolute permeability of the reservoir. Fluid mobility rises with an increase in the effective permeability or a decrease in viscosity. For example, conventional heavy oil recovery techniques increase reservoir temperature to decrease oil viscosity to thereby increase fluid mobility.

Unlike light oil reservoirs, water mobility in very viscous oil reservoirs is commonly many times that of heavy oil and bitumen due to the substantial difference in the viscosities of water and oil at native reservoir conditions. By way of illustrative example, the viscosity of water at native reservoir conditions in an oil sands reservoir is approximately 1 cP as compared to the viscosity of bitumen found in the Cold Lake deposit near Cold Lake, Alberta, which can be greater than 100,000 cP. The viscosity of bitumen found in the Athabasca deposit near Fort McMurray, Alberta, can be much greater than 1,000,000 cP at native reservoir conditions.

The relative permeability of water in an oil-rich zone of a reservoir can be very low, for example, less than 0.01. However, the relative difference in viscosity of water and oil at reservoir conditions can be on the order of $10^3$ to $10^6$. The water mobility therefore remains substantially higher than oil mobility in oil-rich zones of heavy oil and bitumen reservoirs. That is, $$k_{ro}/\mu_{ro} << k_{rw}/\mu_{rw}$$

where:
$k_{ro}$ is the relative permeability of the reservoir with respect to oil;
$\mu_{ro}$ is the dynamic viscosity of oil;
$k_{rw}$ is the relative permeability of the reservoir with respect to water; and
$\mu_{rw}$ is the dynamic viscosity of water.

The efficiency of water transmission through an oil-rich zone increases as $(k_{rw}*\mu_o)/(k_{ro}*\mu_w)$ increases. For reservoirs with effective mobile water in the oil zone this ratio can range up to $10^4$, but any reservoir where this ratio is greater than 1 will have preferential water flow beyond that of oil.

As described herein, a preconditioning agent can be dispersed through a region of the reservoir by providing the preconditioning agent in water, which is mobile within a heavy oil or bitumen reservoir as explained above due to low bitumen mobility. The preconditioning agent can be dissolved, dispersed, suspended, entrained, or a combination thereof, or otherwise included in water. The preconditioning agent-water solution is then introduced into a mobile water zone within the reservoir. The particular location at which to introduce the water, e.g., the interstitial water film, the bottom zone, middle zone or top zone or a combination thereof, can vary depending on the preconditioning agent being introduced and the pre-conditioning effect sought to be achieved.

Figure 2:
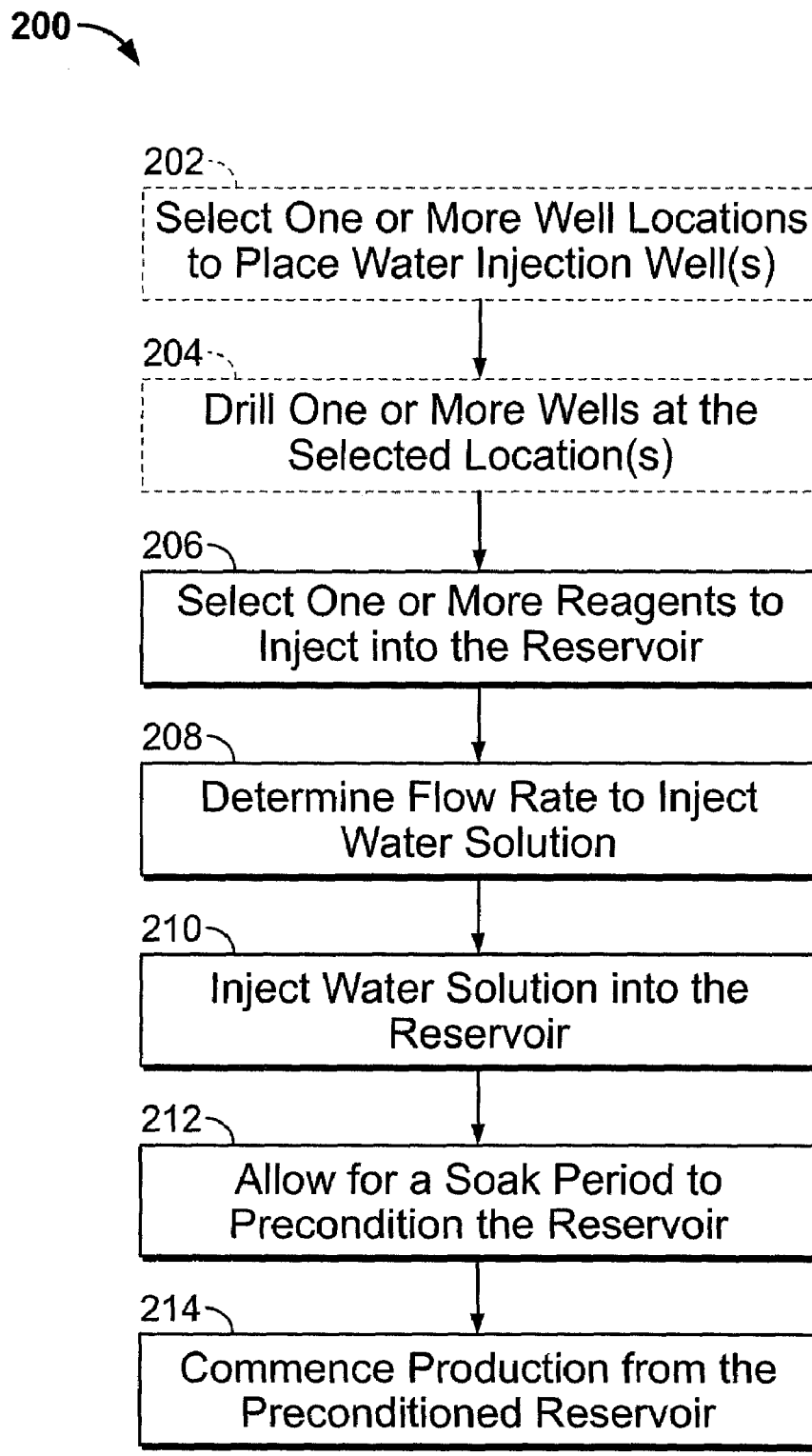
FIG. 2 is a flowchart showing an example process for preconditioning a reservoir and producing a petroleum product.

Preconditioning a Heavy Oil or Bitumen Reservoir with a Water-Borne Preconditioning Agent Referring to FIG. 2, a flowchart shows an example process 200 for pre-conditioning a heavy oil or bitumen reservoir to enhance recovery of a petroleum product. In a first step, one or more well locations are selected to place one or more water injection wells (Step 202). This first step can be optional. In some implementations, for example, if the reservoir was previously subjected to a water flood to recover some petroleum products by conventional methods, existing injection and/or production wells can be used.

If the first step is to be performed, selecting a location to place a water injection well can be based, at least in part, on knowledge of permeability, viscosity or oil compositional variations within the reservoir. Molecular level variations in composition can be proxies for overall bitumen composition and therefore viscosity. The actual compound suites most suitable to assess fluid properties within a reservoir can vary with the level of oil biodegradation and oil composition within the reservoir. The biodegradation level and oil composition can be determined by using standard geochemical protocols and data analysis procedures that look for compound groups that show reproducible changes in composition over a viscosity range of application interest.

Comparison of oil or bitumen molecular fingerprints from solvent extracted bitumen in reservoir core or cuttings, to similar sets of analyses on calibration sets of centrifuge extracted or otherwise extracted raw bitumen, allows for an estimation of dead oil (oil without solution gas) viscosity from the geochemical measurements. Viscosity profiling of the reservoir using direct physical viscosity measurements on mechanically recovered oils or bitumens or geochemical proxy viscosities can therefore be achieved at a meter scale resolution. This high resolution viscosity log, together with a permeability log, can be used to assess the mobility ratios of oil and water at particular regions within the reservoir and therefore to estimate the ability to move a water borne preconditioning agent through the reservoir. The decision of where to place an injection well can be based on this information.

Additionally, the viscosity log can be used to determine what type of recovery process should be used following the reservoir preconditioning, i.e., cold production or a thermal process. The injection well placement can also vary depending on the selected process, as is described further below in relation to FIGS. 3 through 5.

In addition to injecting the water solution, one or more production wells to pump water out of the reservoir can be used to influence the movement of the water solution within the reservoir. Examples of using one or more wells to pump water out of the reservoir to urge the flow of the water solution in certain directions within the reservoir are discussed below in relation to FIGS. 3 through 5.

One or more wells are drilled into the formation at the selected well locations (Step 204). Again, this step is optional, as existing injection or production wells can be used. The well or wells can be drill vertical, horizontal, multi-lateral, at a slant or any combination thereof, or any extended reach well. Generally, a well stimulation process, e.g., an acid frac, is not required, however, in some implementations, a well stimulation can be performed. Preferably, when drilling the well, formation damage is avoided to maintain water infectivity of the reservoir.

A particular preconditioning agent or agents are selected to inject in a water solution into the reservoir (Step 206). In one implementation, the preconditioning agent or agents to be injected and the well locations can be selected based at least in part on a high resolution viscosity log as described above combined with a high resolution permeability log, i.e., an oil mobility log.

By way of illustration, consider an example where the combination of oil viscosity and reservoir permeability logs result in an oil mobility log indicating the most mobile oil being at the top of the reservoir (e.g., the usual case in heavy oil and bitumen reservoirs in western Canada). In this example, after treatment with a preconditioning agent, such as a solution of a water soluble organic solvent (e.g., methyl-propyl-ketone), the bitumen subsurface viscosity in at least part of the reservoir is expected to fall within the Cold Production range. In a reservoir with a vertical viscosity gradient it is most likely that the viscosity and mobility will reach the Cold Production range most easily towards the top of the reservoir, but preconditioning may be used to decrease the viscosity in either the top or the bottom, or anywhere, or throughout the whole reservoir depending on the desired process to be implemented. The preconditioning agent can be therefore selected accordingly, i.e., to modify the viscosity, and reservoir simulation can be used to optimally place wells for both the preconditioning agent flood and the subsequent recovery process. One example of reservoir simulation software that can be used to facilitate determinations as described herein is the STARS™ software available from Computer Modeling Group Ltd. of Calgary, Alberta, Canada, although other reservoir simulation software applications can be used.

By contrast, if in another example the combination of oil viscosity and reservoir permeability logs result in an oil mobility log indicating that even the most mobile oil in the reservoir requires thermal recovery, then a different preconditioning agent may be selected. For example, as discussed further below, a citric acid agent may be selected to enliven the reservoir to enhance recovery using SAGD following the preconditioning. Reservoir simulation can be used to optimally place wells for both the preconditioning agent flood and the subsequent recovery process. However, in this example, if the subsequent recovery process selected is SAGD rather than Cold Production, the well placement will accordingly be different.

A significant factor in selecting the preconditioning agent(s) is the pre-conditioning effect sought to be achieved. That is, the choice of preconditioning agent will differ depending on whether the preconditioning is to change a chemical or physical property of the oil as compared to modifying a chemical or physical property of the reservoir, to name a couple of examples.

The flow rate at which the water including the preconditioning agent(s) will be injected and the duration of injection is selected (Step 208). The flow rate and duration can be determined based on operational factors, for example: the injectivity of the formation (i.e., the effective permeability of the reservoir to water); the quantity of injectant needed; the time available for preconditioning; and, the volume of injectant needed to precondition the reservoir. Reservoir simulation can be used to determine volumetric coverage of the preconditioning agent in the reservoir. For example, a water film "pore volume" refers to the volume of injectant required to replace all of the water film in the reservoir area being targeted with the injected water solution. In some implementations, the preconditioning agent included in the water solution is absorbed or partitioned into the oil, and therefore additional volumes of injected fluid can be introduced to further increase the amount of preconditioning agent absorbed into the oil. By experiment or reservoir simulation, the modification to the reservoir that can be effected by one water film pore volume of injectant can be estimated and used to calibrate the effects expected with the introduction of one or more additional water film pore volumes.

The water including the preconditioning agent(s) is injected into the reservoir at the selected flow rate for the selected duration (Step 210). In some implementations, more than one injection well is used to inject the water and preconditioning agent(s). Additionally, as mentioned above and discussed in further detail below, one or more production wells used to pump water out of the reservoir can be used to influence the movement of the water solution within the reservoir. In one example, water with a first preconditioning agent is injected through a first well and water with a second preconditioning agent is injected through a second well, as shall be described further below.

The pressure of the water injected into the reservoir should be high enough so that injection of water into the reservoir is achieved. This can be set by the current reservoir pressure at the point of perforations of the injection well. The pressure can be higher than this value, however, the goal is to permeate the water film without displacing the oil. By contrast, in a conventional waterflood the pressure and flowrates are significantly higher, as the goal is to displace oil toward a production well. Similarly, steam injection during a thermal recovery process is at much higher pressure and flowrates, as the goal is to recover oil, as compared to the techniques described herein which aim to precondition the reservoir prior to a recovery process. In general, the range of pressure at which the water solution including the preconditioning agent is injected is relative to the reservoir pressure. In some implementations, the injection pressure can range from the reservoir pressure up to the fracture pressure of the reservoir. It should be noted that many of the preconditioning agents described herein can have a positive preconditioning effect, even if some oil movement does occur during preconditioning.

The temperature of the injected water can be at conditions such that it will be in a liquid state at the reservoir pressure. In some examples, the range is from approximately 4° C. up to the boiling point or saturation temperature of the liquid at the reservoir pressure. The saturation pressure and temperature are conditions where both liquid and vapor phases co-exist. When selecting the injection temperature, the solubility of different preconditioning agent(s) in water can be taken into account, as the solubility can vary with temperature.

Referring again to FIG. 2, the preconditioning agent(s) provided in the water injected into the reservoir can be given a "soak period" to migrate throughout the reservoir and perform the desired preconditioning effect (Step 212). The duration of the soak period can vary depending on the preconditioning agent introduced into the reservoir, reservoir characteristics and the preconditioning effect sought to be achieved. In some examples, the soak period endures for weeks or even months. Production from the reservoir for a petroleum product can then be commenced (Step 214). Depending on the petroleum product desired to be produced and the preconditioning agent injected, one or more different techniques for recovery from a heavy oil or bitumen reservoir can be used, including conventional cold production techniques, or thermal assisted techniques, such as CSS or SAGD.

In some implementations, a first water-borne preconditioning agent can be injected into a first zone in the oil-rich zone, e.g., a lower region, and a second water-borne preconditioning agent (possibly at a later time) can be injected into a second zone in the oil-rich zone, e.g., a higher region. That is, preconditioning of the oil-rich zone can be customized for different regions within the oil-rich zone to account for differing properties of the regions. In other examples, the preconditioning effect of the first zone can have an impact on the preconditioning effect of the second zone. That is, preconditioning of the first zone is a step in a process to precondition the second zone. As will be shown herein, the techniques described provide significant flexibility for customized preconditioning of a reservoir.

Once the process to deliver a preconditioning agent into a heavy oil or bitumen reservoir is understood, as set forth above, there are numerous implementations for the process. Depending on the desired preconditioning effect sought, the location of injection of the water-borne preconditioning agent can vary, the type of preconditioning agent can vary and the petroleum product thereafter produced can vary. Some example implementations are described below, however, it should be understood that other implementations can exist, and the ones described are illustrative and not limiting.

Example 1

Modifying the Viscosity of the Oil or Bitumen in the Reservoir

In one implementation, the water-borne preconditioning agent injected into the mobile water film of a heavy oil or bitumen reservoir is selected to modify the viscosity of the oil in the reservoir. The preconditioning agent can partition from the water into the oil within the reservoir, reducing its viscosity and thereby promoting speed and efficiency of recovery under cold or thermal recovery conditions. In some implementations, the water-borne preconditioning agent introduced into the oil saturated zone of the reservoir can be a water soluble organic solvents which partition into the oil phase from the water film, e.g., a ketone, alcohol or ether, that can reduce oil viscosity. Some further examples include methyl propyl ketone (MPK), methyl ethyl ketone, methyl tertiary-butyl ether (MTBE). Other examples include carbon dioxide, carbon disulphide and hydrogen sulphide in an aqueous solution which can partition into the oil as solvents and reduce viscosity. Reservoir simulation can be used to determine placement of wells, flow rate, duration and extent of preconditioner volumetric coverage in the reservoir.

Physical properties of the some example preconditioning agents are set forth in Table 1 below.

TABLE 1

Physical Properties of Example Agents

| Agent | Molecular Weight (g/mol) | Molecular Formula | Melting Point (degrees C.) | Boiling Point (degrees C.) | Solubility in Water at 20° C. (g/l) |
|---|---|---|---|---|---|
| MPK | 86.13 | $C_5H_{10}O$ | −76.9 | 102.2 | 31 |
| MTBE | 88.15 | $C_5H_{12}O$ | −109 | 55.2 | 48 |

Figure 3:
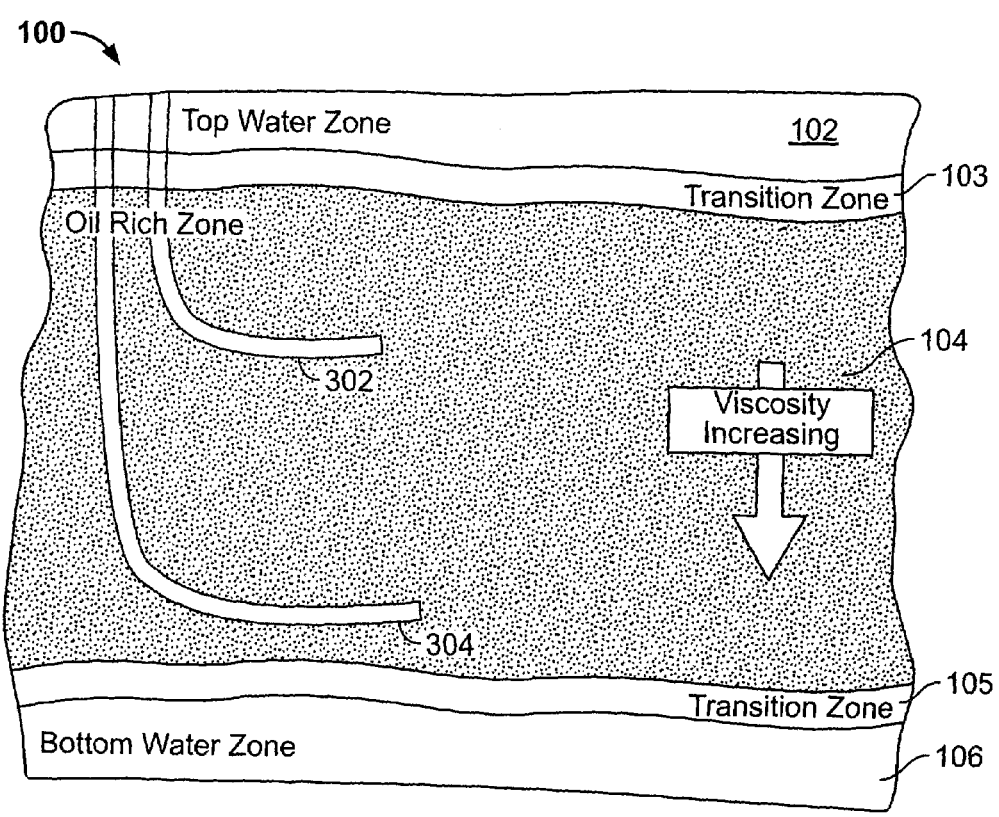
FIG. 3 is a schematic representation of a cross-sectional view of a reservoir undergoing cold production.

Referring now to FIG. 3, in one implementation a preconditioning agent to modify the viscosity of the reservoir can be used to precondition a reservoir prior to cold production. In this example, based on experimental data or reservoir simulation, and information known about the oil-rich zone 104, e.g., the oil mobility log, it is determined that the viscosity in the reservoir is increasing with increasing depth while the mobility of the oil decreases with increasing depth. It is further determined (e.g., by reservoir simulation) that after preconditioning the reservoir, the viscosity of substantially all of the oil-rich zone 104 will be within the range for cold production, i.e., less than approximately 50,000 cP for dead oil at 20° C. Well bore 302 shows an example well that could have been drilled without preconditioning for cold production processing. That is, the viscosity of the reservoir at the depth the well bore 302 and above this well is, is within the range for cold production. Well bore 304 shows an example well than can be drilled and used for cold production if the reservoir is preconditioned. That is, after preconditioning the reservoir, the viscosity at the much greater depth of the well bore 304 and above will be within the cold production range. The well bore 304 can be used to introduce the preconditioning agent included within a water solution into the oil-rich zone 104. After a soak period, the same well bore 304 then can be used for cold production.

This example illustrates the advantageous effects of preconditioning the reservoir to modify the viscosity. The volume of oil available for cold production after preconditioning is significantly larger than without preconditioning. Accordingly, additional oil can be extracted without resorting to more costly processing techniques such as thermal processes.

In some implementations, a production well can be drilled a distance away from the injection well. Water can be pumped out of the reservoir from the production well, thereby urging the injected preconditioning agent-bearing water solution into the direction of the production well and influencing the movement of the preconditioning agent within the reservoir.

Reservoir Simulation Model Example

Referring now to FIGS. 4A-6, an example using a reservoir simulation model shall be described to illustrate the beneficial effects of preconditioning a heavy oil or bitumen reservoir with a viscosity modifying preconditioning agent. In this example, the reservoir simulation model used had properties typical to that of an Athabasca oil sands reservoir. The horizontal permeability ranges from approximately 678 to 4156 mD. The porosity ranges from nearly zero to approximately 0.34. The oil saturation ranges from approximately 0.43 to 0.96.

Figure 4A:
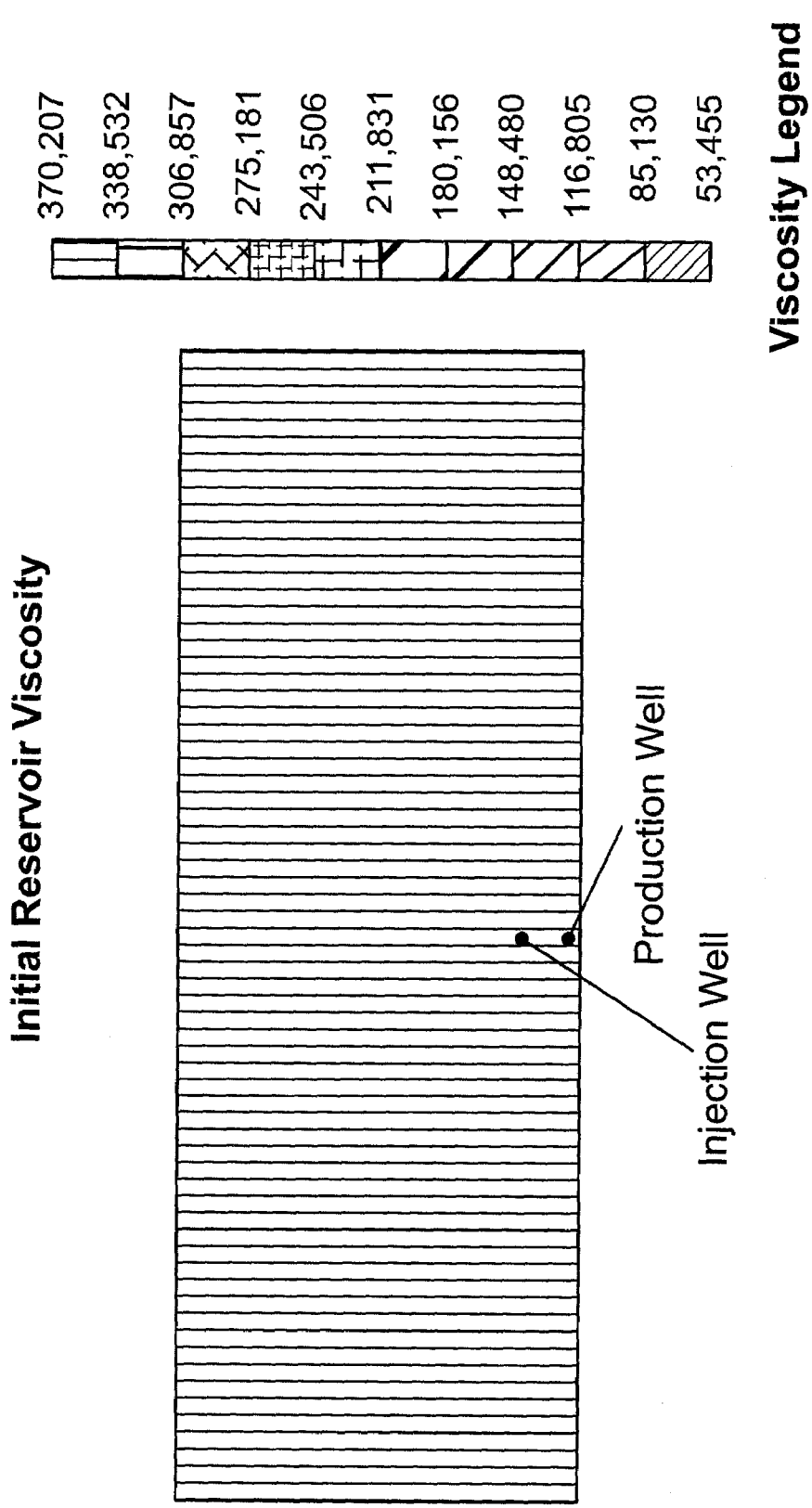
FIG. 4A is a representation of an initial viscosity distribution in a reservoir simulation model.
Figure 4B:
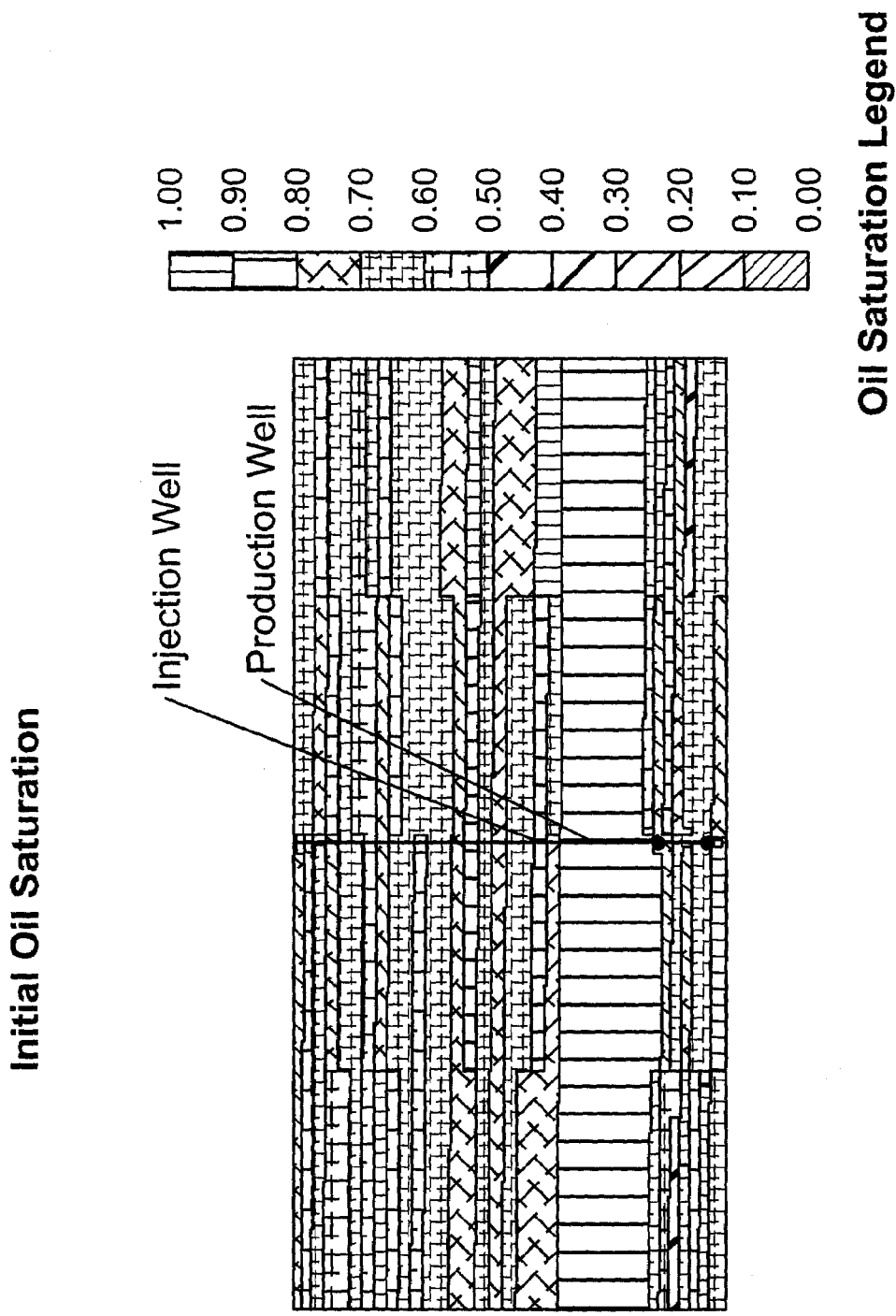
FIG. 4B is a representation of an initial oil saturation distribution in a reservoir simulation model.

Referring to FIGS. 4A and 4B, the initial viscosity distribution of the reservoir and the initial oil saturation are shown. The initial oil viscosity is nearly uniform through the reservoir and is approximately 368,000 cP. Horizontal injection and production wells are depicted (viewed as points extending into the page) in a typical well pair configuration used for SAGD.

During thermal recovery operations, steam is injected into the injection well and hot fluids, including bitumen, condensate and gas, flow out from the production well. Near the wells, the simulation grid spacing of the model is approximately 1.3 m (horizontal) by 1.1 m (vertical) in the crosswell direction. At the lateral edges of the model, the grid is roughly 3.3 m (horizontal) by 1.1 m (vertical) in the crosswell direction. The crosswell and vertical directions of the entire reservoir simulation model are approximately 200 m and 35 m respectively (the figures are not to scale). The injection pressure is set to 2500 kPa.

Figure 5A:
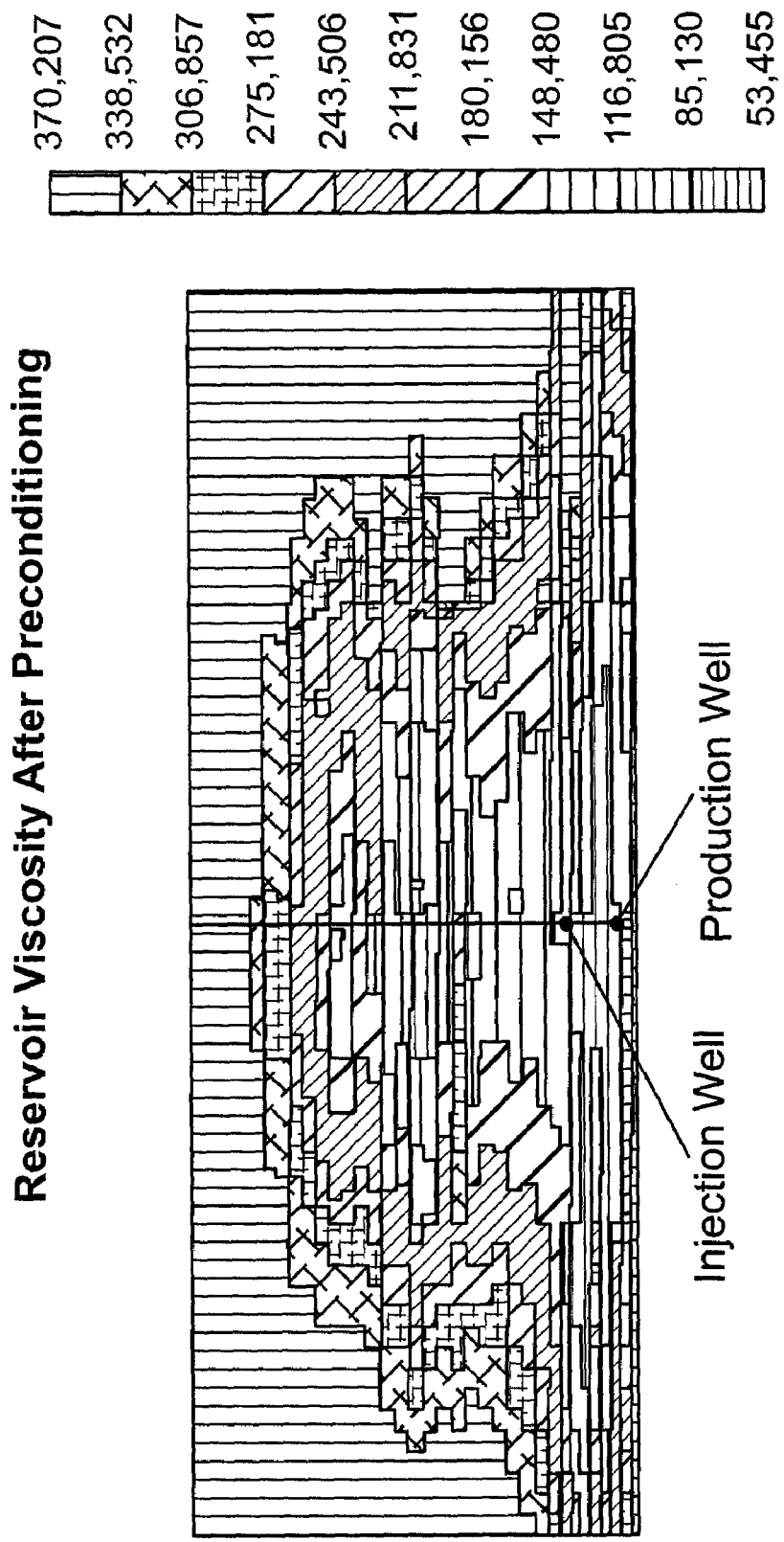
FIG. 5A is a representation of the viscosity distribution in the reservoir simulation model showing the effects of preconditioning with a water-borne agent.
Figure 5B:
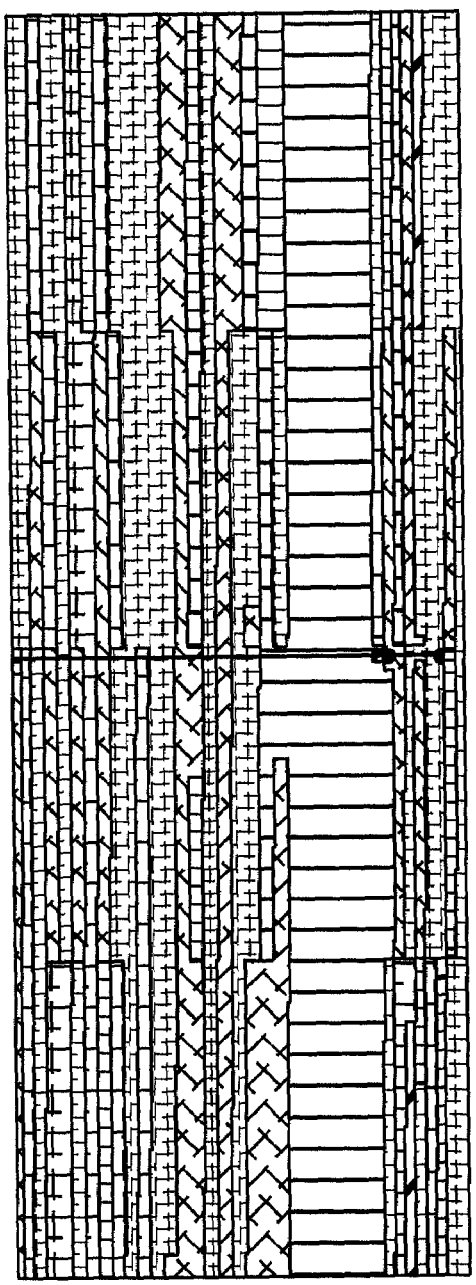
FIG. 5B is a representation of the oil saturation distribution in the reservoir post preconditioning.

FIGS. 5A and 5B show the viscosity and oil saturation in the reservoir simulation model after eight months of preconditioning the reservoir with a viscosity modifying agent. In this example, the preconditioning agent is an aqueous solution of MPK. As is illustrated in FIG. 5A, the oil viscosity in the region of the reservoir surrounding the injection well after the 8-month soak period, both laterally and vertically, is significantly lower than the initial viscosity. The reason the viscosity is lowered in a region surrounding the well is the dissolution of the MPK, which was transported through the region in solution in water by way of the mobile water film, and absorbed into the surrounding oil from the water lowering its viscosity. The lower the viscosity, the more mobile is the bitumen and the higher the petroleum production rate from the production well.

Referring to FIG. 5B, the change in the oil saturation after the 8-month soak period is nearly not recognizable. This is consistent with the low pressure nature of the flood of water including the MPK agent, which allows the preconditioning agent to enter into and travel through the oil-rich zone of the reservoir in the water in the oil-rich zone with little or no displacement of the oil therein.

Figure 6:
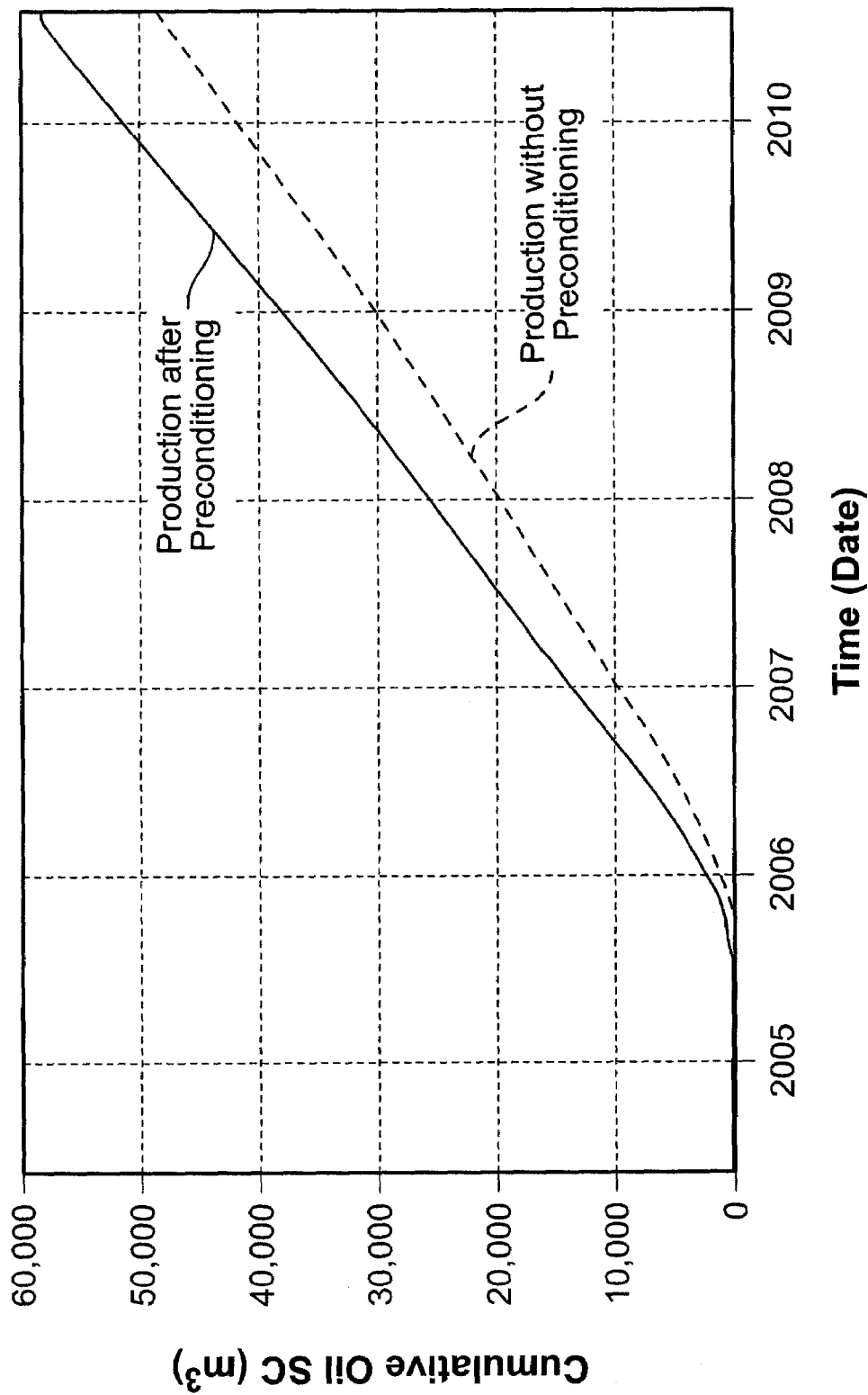
FIG. 6 is a graph showing oil production over time for the reservoir simulation model with and without preconditioning.

FIG. 6 is a graph showing the cumulative oil recovery curves (at standard conditions "SC") from two SAGD recovery processes. The broken line represents oil recovery if the preconditioning was not undertaken. The solid line represents oil recovery after the 8-month soak period. All reservoir conditions, fluid properties and well placements are otherwise identical in the two models corresponding to the two recovery curves. The results clearly show that the oil rate of production can be improved by preconditioning the reservoir with a viscosity modifying agent. For example, at 4.5 years of production, the preconditioned reservoir has around 15-20% more cumulative bitumen recovered than the non-preconditioned reservoir. This increment of production rate and recovery can have significant economic benefits and reduce the amount of steam (heat) injected into the reservoir to achieve any recovery target, which in turn reduces emissions of greenhouse gases. The MPK can be recovered at surface by distillation and reused to precondition a reservoir elsewhere.

Example 2

Enlivening the Reservoir Petroleum with Increased Solution Gas

In another implementation, the preconditioning agent is a water soluble agent that decomposes under "recovery process conditions" to produce a gas that "enlivens" the oil within the reservoir. That is, oil undersaturated with solution gas has a greater viscosity than gas saturated oil. In this implementation, the preconditioning effect sought to be achieved is the addition of solution gas back into the reservoir to further "enliven" the oil and repressurize the reservoir. The gas produced by the preconditioning agent can add solution-gas drive capability to the oil to promote thermal or cold production. Reservoir simulation can be used to determine placement of wells, flow rate, duration and extent of preconditioning agent volumetric coverage in the reservoir.

Figure 7A:
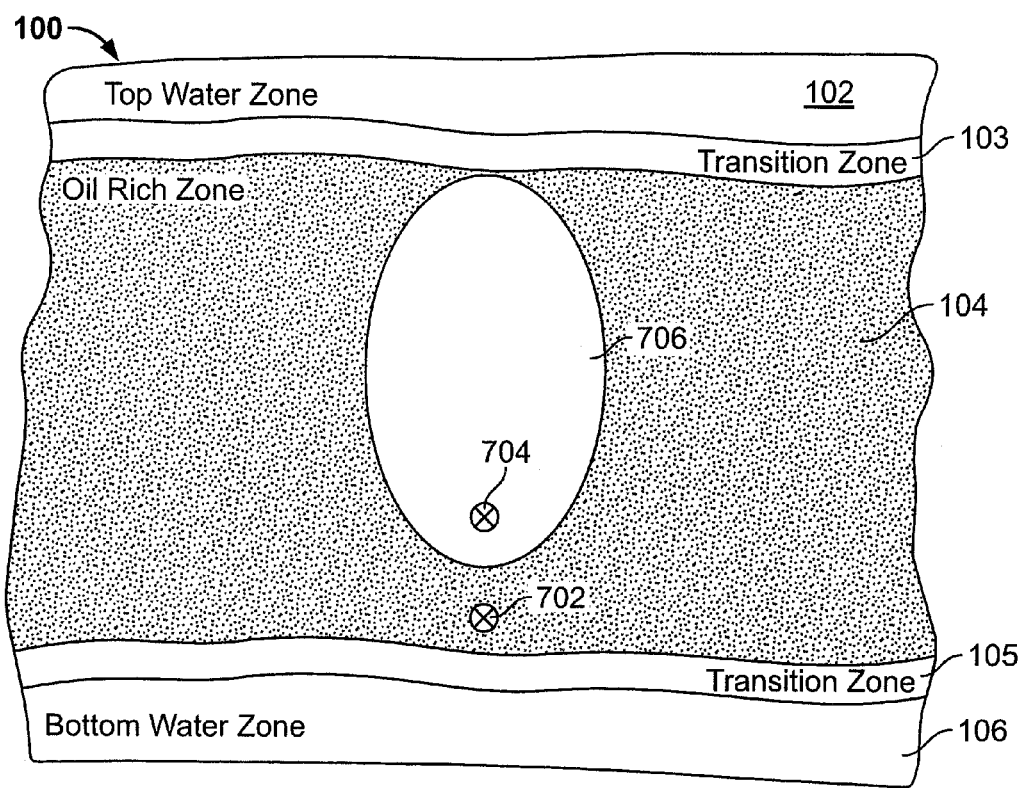
FIG. 7A is a schematic representation of a cross-sectional view of a reservoir undergoing a conventional SAGD process.

In one implementation, the "recovery process conditions" refer to conditions typically found under SAGD or CSS thermal recovery conditions. Referring to FIG. 7A, a schematic representation of a cross-sectional view of a reservoir undergoing conventional SAGD processing is shown. Element 702 represents a cross-sectional view of a production well bore, where the well bore extends into the page. Element 704 represents a cross-sectional view of a steam injection well bore, where the well bore extends into the page. The steam chamber created by the injected steam is represented by element 706. As is typical in a conventional SAGD process, the steam chamber 706, at least initially, takes on an elongated shape in a vertical direction.

For illustrative purposes, an experiment conducted to simulate the impact of a recovery process on selected preconditioning agents under reservoir conditions shall be described. Samples of the selected preconditioning agents in a water solution were heated in sealed pressure vessels at the temperature and pressure conditions typically found in the portion of a reservoir near the edge of a steam chamber (e.g., steam chamber 706) in a reservoir undergoing SAGD processing. In one such experiment, the preconditioning agent was citric acid which was dissolved in water to create the water solution. The recovery process conditions were SAGD conditions at approximately 205° Celsius (C.). The citric acid had three carboxyls per molecule present as carboxylic acid and was converted to gaseous carbon dioxide ($CO_2$) and propane in an approximate 73 hour experiment in the presence of liquid water at 205° C. The final operating pressure was approximately 990 psi (68 bar) at approximately 205° C.

Approximately 5 grams of citric acid, which was 50 milliliters of a 10% solution, yielded approximately 1.16 liters of $CO_2$ in a headspace formed within the vessel. Relatively small amounts of methane and propane, approximately 1500 ppm (parts per million) and 300 ppm respectively, were also found present in the headspace gas, which also facilitates viscosity reduction as these gases would also dissolve in the reservoir oil.

Scaling of this volume of $CO_2$ generation could yield 23,200 liters of carbon dioxide from 1 cubic meter of 10% citric acid solution. Such a volume of gas could dramatically change oil fluid properties when absorbed reducing viscosity. As conversion of the citric acid occurs rapidly on recovery process timescale, the local pressure increase in the reservoir can be large and motivate oil flow to the production well(s).

Figure 7B:
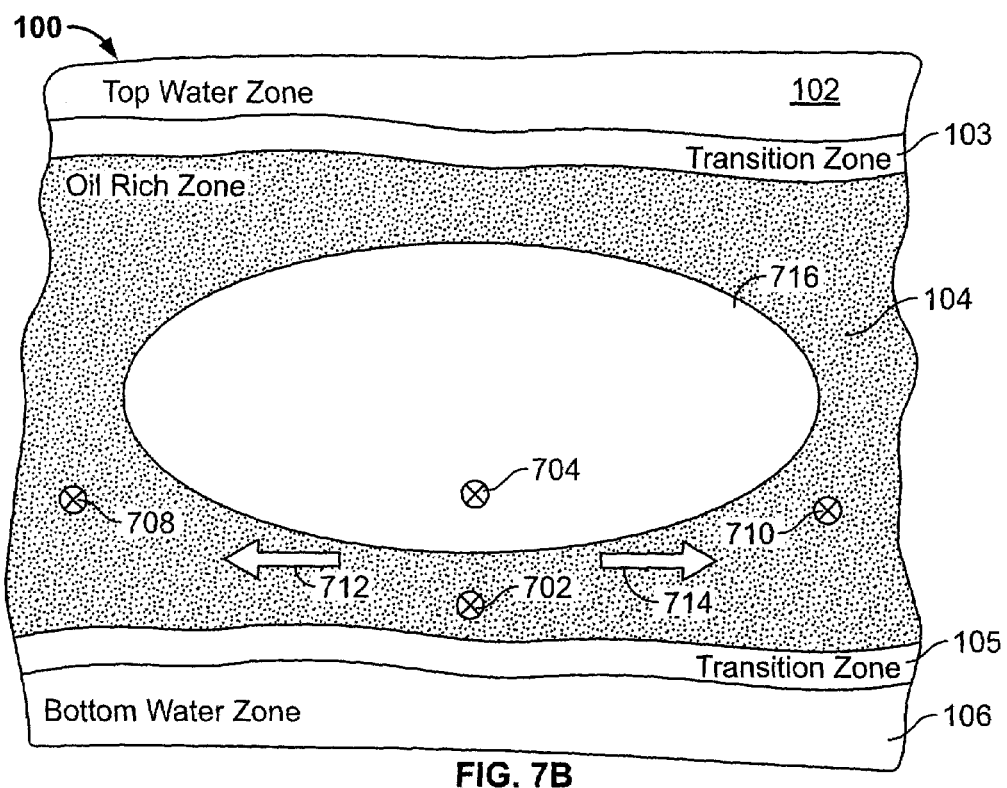
FIG. 7B is a schematic representation of a cross-sectional view of a reservoir undergoing a SAGD process following preconditioning of the reservoir.

By selecting injection points from wells used to flood the preconditioning agent into the reservoir, such that only the lower portion of a bitumen reservoir is preconditioned, reservoir simulations suggest that the expanding SAGD steam chamber tends to broaden rather than quickly rise vertically through the reservoir, increasing total recoverable bitumen. Referring to FIG. 7B, the water solution including the citric acid can be introduced into the reservoir using the injection well 704 before any steam injection. Wells 708 and 710 are production or control wells that optionally can be used to pump water from the reservoir and thereby pull the water solution in the direction of the arrows 712 and 714 respectively. The lower portion of the reservoir is thereby preconditioned with the citric acid to enliven the oil. Subsequently, when SAGD processing is commenced by injecting steam through well 704 and the citric acid preconditioned portion of the reservoir generates carbon dioxide locally increasing pressure and reducing oil viscosity, the steam chamber 716 tends to grow laterally over a larger portion of the reservoir, rather than quickly rising in a vertical manner. Advantageously, a larger volume of oil is impacted by the SAGD operation and thereby recoverable.

The steam chambers are observed to migrate preferentially into preconditioned zones, as there the oil is more mobile and flow is promoted by the gas generation process. The lower the viscosity of the oil, achieved by preconditioning, the greater the production rate of oil. This means that the steam depletion chamber grows more rapidly in the reservoir. Since the flood direction of the preconditioning agent can be controlled to some extent by well placement and pressure management, the zone that the preconditioning agent permeates can be controlled. Thus, the zone of reduced oil viscosity is controlled and this oil will be produced more rapidly from the preconditioned reservoir parts, than oil or reservoir that has not interacted with the preconditioning agent. For parts of the oil reservoir that have been enlivened by the gas generating preconditioning agent, the oil viscosity is lower and also the additional solution gas provides solution-gas drive capability as a drive mechanism for oil production. This leads to a steam chamber shape that evolves into the zones where the preconditioning agent contacted the oil or reservoir or both.

In other implementations, other carboxylic acids, for example inexpensive and commercially available oxalic acid dihydrate, can be used as the preconditioning agent. However, some acids such as succinic acid may be more resistant to decomposition at SAGD conditions and are therefore not be preferred in preconditioning a SAGD process, but can have value preconditioning a reservoir for a higher temperature recovery process, such as in situ combustion. By way of example, in another experiment, three days of heating 5.0 g oxalic acid dihydrate and 50 milliliters of water at 205° C. under SAGD conditions resulted in the conversion of oxalic acid to a gas containing carbon dioxide (1.25 moles $CO_2$/mole of oxalic acid dehydrate), methane (0.56 moles/mole of oxalic acid dihydrate) and some free molecular hydrogen. All these gases can dissolve into the oil thereby reducing the viscosity, and the conversion process produces a reservoir repressurisation as gases are produced from condensed solid and liquid phases. Thus gas production helps to enliven the oil and support additional production of reservoir fluids, including oil, from the reservoir. Production of free hydrogen can be favorable for any in situ process that requires hydrogen for improving oil quality.

The gas producing agent can be selected based on availability and reactivity. Citric acid and oxalic acids are inexpensive, available and environmentally friendly options. Citric acid and other acids also have the added benefit, shown experimentally, that fines mobility (small particles of minerals including clays that become detached from the reservoir during production and that can potentially block pore throats causing formation damage and restricting flow) can be greatly reduced when a citric acid preconditioning flood is performed, reducing formation damage during the subsequent recovery process. In some reservoirs such as carbonate mineral rich reservoirs, mineral dissolution occurs as well, increasing permeability of the reservoir.

In some implementations, alkali metal or alkaline earth metal salts of carboxylic acid can be injected in a water solution into a reservoir to lower the $CO_2$ generation temperature relative to the carboxylic acid itself. As a result of the oil enlivening process, a thermal process (e.g., SAGD, CSS or steamflood (SF)) can be operated at reduced temperatures, which implies lower heat losses, which in turn implies greater thermal efficiency, reduce environmental impact and economic advantage. The operating pressure can also be lowered, meaning smaller facilities specifications for steam generation, which can have an economic benefit.

Processes relying on solution-gas drive as the main drive mechanism for oil recovery can have improved recovery using a citric acid based preconditioning agent. As discussed above, the citric acid adds solution gas back into the heavy oil or bitumen. During subsequent thermal recovery, after the oil is heated, the solubility of the solution gas drops and it comes out of solution and forms bubbles of gas in the pore space in the reservoir. As the reservoir pressure falls due to production, the gas bubble volumes grow not only due to more gas coming out of solution but also due to expansion. In the process of expansion, the gas bubbles push oil in the reservoir typically in the direction of the production well, which is a low pressure point in the reservoir.

As is illustrated above, reservoir simulations indicate that the $CO_2$ generated from a citric acid water film flood can partition into the bitumen or oil and reduce oil viscosity, thereby promoting recovery. Increased solution gas can further enhance recovery as a drive-mechanism. Selective placement of agents can be used to selectively increase oil mobility (e.g., laterally) and to promote steam chamber migration in a preferred direction (e.g., sideways rather than upwards). Increased sideways growth of the steam chamber is preferred to dominantly vertical growth, especially when the steam chamber is near the top of the oil zone, as this results in smaller heat losses to the caprock above the oil zone and can render the process more thermally efficient.

The physical properties of example preconditioning agents that can be used in the above implementation are shown in Table 2 below.

TABLE 2

Physical Properties of Example Agents

| Agent | Molecular Weight (g/mol) | Molecular Formula | Melting Point (degrees C.) | Boiling Point (degrees C.) | Solubility in Water at 20° C. (g/l) |
|---|---|---|---|---|---|
| Citric Acid | 192.123 | $C_6H_8O_7$ | 153 | 175 (decomp) | □590 |
| Succinic Acid | 118.09 | $C_4H_6O_4$ | 188 | 235 | 77 |
| Oxalic Acid | 90.03 126.07 | $C_2H_2O_4$ $C_2H_2O_4 \cdot 2H_2O$ | 101.5 | 149-160 | 99 |

In other implementations, to enliven oil or bitumen with carbon dioxide gas to permit cold production without using thermal degradation of a carboxylic acid, a flood of carboxylic or hydrochloric acid aqueous solution from one injection well can be combined with a subsequent or earlier flood of water soluble carbonate mineral from the same or additional wells to generate carbon dioxide at a desired point in the reservoir to enliven the oil or bitumen with gas.

Example 3

Creating a Barrier Layer

In some implementations, the preconditioning agent can be selected to immobilize, bind or gel oil by the addition of reactants. The desired preconditioning effect is to immobilize oil to make a barrier for controlling water flow in a reservoir probably, typically from a top or bottom water zone. In one example, the preconditioning agent can be a liquid aluminum phosphate salt gelling agent produced from mixing a phosphate ester with an aluminum compound to form the aluminum salt of the phosphate ester. If this process is carried out via successive mobile water film flooding of the two reactants (i.e., phosphate ester and aluminum salts) and activators, then a zone of immobilized oil can be created. The process can be especially effective from a top or bottom water zone. Other water soluble components that precipitate asphaltenes or calcium naphthenates on contact with oil, such as injected solutions with high concentrations of calcium (e.g., a calcium chloride solution) can also be used. As another example, compounds or mixture that affects the rheology of crude oils in a viscosity increasing manner can be used as the preconditioning agent.

Figure 8:
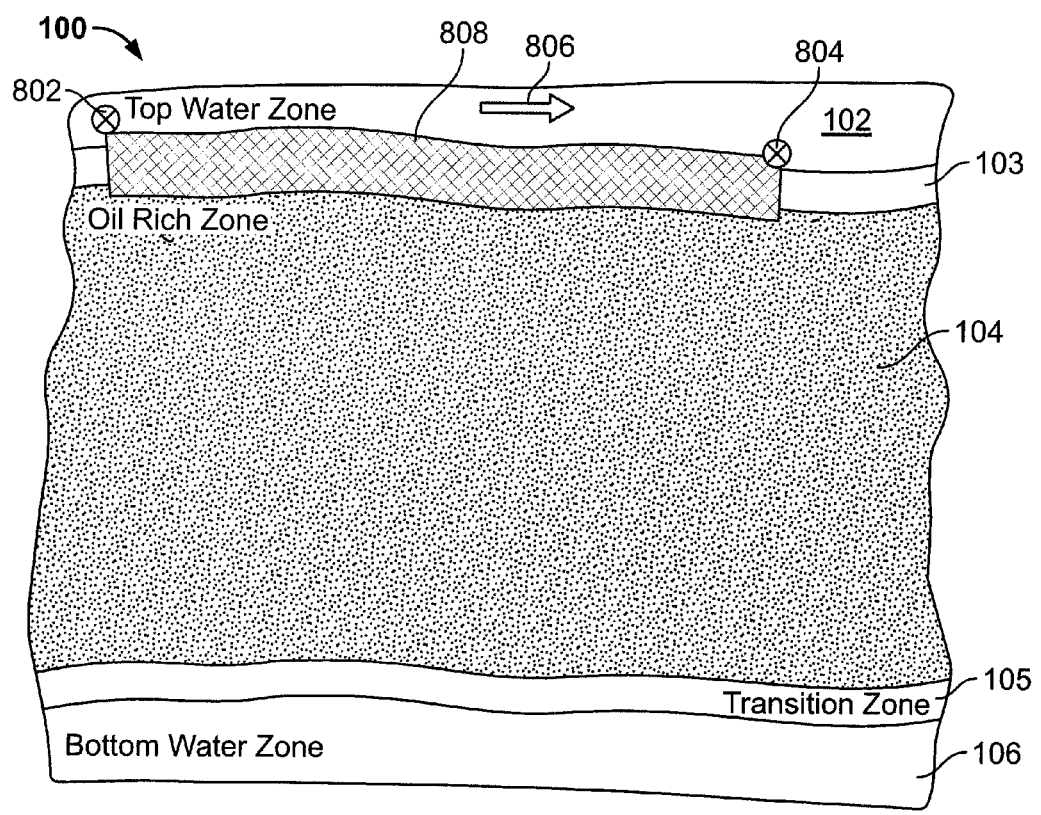
FIG. 8 is a schematic representation of a cross-sectional view of a reservoir following preconditioning to form a highly-viscous fluid barrier.

Referring to FIG. 8, in some implementations, the water-borne preconditioning agent is injected into the top water zone of a heavy oil or bitumen reservoir, for example, top water zone 102. The top water may have been a paleo-gas cap that now includes water. The preconditioning agent is transported in the top water zone and contacts oil located at or near the top of the oil column (i.e., the top of oil-rich zone 104). In the example shown, the water-borne preconditioning agent is injected through a well bore 802. A second well bore 804 a distance away from the injection well bore 802 is used to pump water out of the reservoir, and thereby pull the injected water solution in the direction of arrow 806. If a production well had been drilled into the oil rich zone 104, then water production there can also be used to pull the conditioning flood down into the reservoir.

The preconditioning agent or agents are selected to cause a highly viscous oil phase to form, e.g., by precipitation, crosslinking or phase separation or to change the wettability of the boundary layer to demote water flow, i.e., by making the reservoir oil wet. A barrier layer 808 can thereby be created at the top of the oil zone, producing a high viscosity seal or flow barrier in that region. This can be used as a preconditioning step for a cold or a thermal recovery process that drills wells into and targets the oil-rich zone 104, for example, to restrict interface from the water zone or loss of gases, steam or heat to the top water zone.

Some example preconditioning agents that can be used in the above described implementation include alkylphenols to promote wettability change in a boundary layer; metal ions or multidentate ligand organic compounds that facilitate binding of the non-hydrocarbons in the oil; and soluble calcium salts that can precipitate naphthenates from acid heavy oils or oxidants such as chlorates or perchlorates that facilitate low temperature oxidation and crosslinking of the oil when a high temperature thermal front approaches the modified boundary layer.

Example 4

Modifying the Wettability of the Reservoir

In one implementation, the preconditioning agent is selected to modify the wettability of the reservoir. Wettability refers to the phase in a reservoir that is in contact with the mineral surfaces of the reservoir. Often in a native state the reservoir surfaces are wetted with water. Changing the wettability of the reservoir such that oil is in direct contact with reservoir mineral surfaces (i.e., oil wet) can aid in sorption of polar petroleum phases, e.g., resins and asphaltenes, to mineral surfaces. This can improve oil quality and reduce viscosity, or change the capillary force balance, such that water flow is restricted in the now oil wet reservoir section. This may be important in controlling water flow from a top or bottom water zone. Modifying the wettability can also have the effect of increasing API gravity and reducing viscosity of produced petroleum by depositing and sorbing petroleum non-hydrocarbons on mineral surfaces.

The properties desired in a wettability modifying agent include water solubility; the ability to sorb to a mineral surface via a functional group or other polar site; and a hydrophobic component to the molecule to rupture a mineral bound water film and aid oil or bitumen sorption to the mineral surface. The preconditioning agent flooded into the reservoir via mobile water preferentially dissolves in the interstitial water film, where the preconditioning agent migrates to the rock surface and changes the wettability to oil wet. This allows polar and high molecular weight material to sorb onto the mineral surface and be held back during production, allowing improved quality, lower viscosity, higher API gravity oil to migrate to a production well.

Examples of preconditioning agents that can be used to modify the wettability include phenol, C1-C3 alkylphenols and naturally occurring and more environmentally friendly polyphenols. These preconditioning agents have an oil to water partition coefficient (Kow) ranging from approximately 1 to 70, which means that significant concentrations of the preconditioning agent can be dissolved in the water phase in equilibrium with oil; this material will strongly sorb to mineral surfaces changing the rock to oil wet. These compounds show solid-fluid distribution coefficients (Kd) between reservoir waters and minerals of up to 180 mL/gm, indicating strong sorption to mineral surfaces.

By way of example, an experiment described below was conducted that illustrates the effect of a wettability preconditioning agent on a bitumen reservoir sample. The experiment was conducted using a mechanical device that allows a user to perform a physical model experiment of a recovery process by motivating bitumen and or water to flow through an oil sand sample under reservoir conditions. The oil extraction and physical modeling device is described in detail in Canadian Patent Application No. 2,578,319. The physical modeling device allows the application of a liquid agent to an oil sand sample to precondition the sample prior to evaluating the effect of the preconditioning agent on possible recovery processes. The sample can be heated or cooled to simulate phase changes naturally occurring in reservoirs including gas/liquid/solid conversions, oil or water viscosity modifications, wettability changes and gas/water, hydrate formation and the effect of solvent addition.

In the present experiment, a frozen oil sand core sample with original oil and water distributions in place was placed in the device and allowed to thaw. It was then gently compressed to return the sample to reservoir state. The flooding water including the preconditioning agent was then flowed slowly over several hours or days through the sample. After an appropriate period of time bitumen was caused to flow from the reservoir sample and was analyzed for viscosity and chemical composition.

Table 3 below shows laboratory experimental results achieved when introducing three example preconditioning agents into separate oil sand samples. One agent, phenol, changes the sample wettability while two organic solvents (MPK and MTBE) partition into oil in the core sample and reduce its viscosity. During the experiment, aliquots of 225 grams of the oil sand sample were compacted to reservoir conditions. A water solution in the amount of 20 milliliters, which represented approximately a volume of water equal to three times the volume of water in the samples residual water film (i.e., three pore film volumes) and including the example preconditioning agents at saturation solubility in water were added on top of the sample in the physical modeling device. The water solution was gently flooded through the oil sand sample pore system using a pressure gradient, after which the contents were left standing for approximately three hours at ambient temperature. The device was then operated to simulate a recovery process by applying a pressure gradient to the sample. Oil and water was collected from the simulated recovery process and viscosities and chemical compositions thereof were measured.

TABLE 3

Experiment Results

| Water Solution Composition | Load at which oil flow starting | Oil amount Recovered | Viscosity (cP) 20° C. | 50° C. | 80° C. |
|---|---|---|---|---|---|
| 20 ml H$_2$O saturated with MPK | 8-10 tons | 12.4 g | 18951 | 1461 | 288 |
| 20 ml H$_2$O saturated w. MTBE | 8 tons | 10.9 g | 50470 | 2498 | 401 |
| 20 ml H$_2$O saturated with phenol | 12-14 tons | 9.9 g | 64691 | 2600 | 351 |
| 20 ml H$_2$O w/o additives | 12-14 tons | 7.3 g | 182069 | 5391 | 557 |

The second column in Table 3 indicates the load on the sample at which oil began to flow during the recovery process which was carried out at 85° C. The third column indicates the amount of oil recovered. The fourth, fifth and sixth columns show the viscosity of the recovered oil measured at temperatures of 20, 50 and 80 degrees Celsius respectively.

The first row shows the results when the preconditioning agent was an aqueous solution of methyl propyl ketone (MPK), which preconditioning agent modifies oil viscosity. The second row shows the results when the preconditioning agent was an aqueous solution of methyl tertiary-butyl ether (MTBE), which preconditioning agent modifies oil viscosity. The third row shows the results when the preconditioning agent was an aqueous solution of phenol, a preconditioning agent affecting the wettability of the sample to promote retention of polar compounds in the rock sample during recovery and thus decrease viscosity. The fourth row shows, for comparative purposes, the results when the oil sand sample is left untreated.

As is illustrated by the above experimental results, the amount of oil recovered increased significantly after preconditioning with either the phenol, MPK or MTBE preconditioning agent. The reason for the increased recovery can be attributed, at least in part, to the effect on viscosity by the preconditioning process involving either solvent partition into the oil from the water (MTBE, MPK) and wettability change and solvent partition (phenol). The viscosity was reduced significantly relative to the control sample, particularly at the lower temperatures. Cold production of a heavy oil or bitumen reservoir can occur if the viscosity of the dead oil is less than approximately 50,000 cP at 20° Celsius. By using either the phenol or MPK or MTBE as a preconditioning agent, oil otherwise unrecoverable by cold production due to a high viscosity (180000 cP at 20° Celsius) can be produced by cold production if its viscosity after preconditioning is below the threshold required for cold production. In this example non cold production petroleum was converted by preconditioning into cold production petroleum using MTBE or MPK or phenol prefloods.

Typical physical properties of the example preconditioning agents that can be used in the implementation described above, i.e., MPK and Phenol, are shown in Table 4 below.

TABLE 4

Physical Properties of Example Agents

| Agent | Molecular Weight (g/mol) | Molecular Formula | Melting Point (degrees C.) | Boiling Point (degrees C.) | Solubility in Water at 20° C. (g/l) |
|---|---|---|---|---|---|
| MPK | 86.13 | C$_5$H$_{10}$O | −78 | 102 | 31 |
| Phenol | 94.1 | C$_6$H$_5$OH | 40.5 | 181.7 | 83 |

Reservoir simulation can be used to determine placement of wells, flow rate, duration and extent of preconditioner volumetric coverage in reservoir. Wells to inject wettability modifying precondition agents can be observation wells or appraisal wells drilled to set the production wells, the actual injection and production wells themselves or wells drills expressly for the purposes of introducing the preconditioning agent water solution.

Example 5

Modifying Chemical or Physical Properties of the Oil

In one implementation, the preconditioning agent is selected to upgrade the oil in the reservoir. That is, the preconditioning effect sought to be achieved is a pre-production upgrade to the oil. The term upgrade means a beneficial change in chemical or physical properties of the oil. By way of illustrative example, an upgrade can include reduction in viscosity, increase in API gravity and/or reduction of sulphur content. In this implementation, the preconditioning agent is injected into the reservoir in a location chosen using reservoir simulation to determine placement of wells as well as flow rate, duration and extent of preconditioner volumetric coverage in reservoir. Wells to inject preconditioning agents can be observation wells or appraisal wells drilled to set the production wells or the actual injection and production wells themselves.

Example 6

Injecting Multiple Preconditioning Agents

In some implementations, two preconditioning agents are injected into a reservoir through the mobile water film. After a period of time, one of the preconditioning agents interacts with the oil to produce another component, which can react with the second preconditioning agent and subsequently produces a material that actively participates in upgrading the oil once the reservoir is exposed to thermal recovery processing (e.g., SAGD or CSS). The upgraded and less viscous oil can then be produced to a production well.

In other implementations, two preconditioning agents are injected through the mobile water from separate wells. In one implementation, a production well pumping water out of the reservoir can control the water movement by increasing or decreasing pressure, such that a flood being motivated through another well is directed in a favorable direction. The preconditioning agents interact with each other to produce a wall of reactive component. The reactive component can positively affect a recovery process by either increasing oil quality (e.g., increasing API gravity and/or reducing viscosity) through a chemical or physical process or producing a barrier to restrict or direct oil or water flow. In one example, the precipitation of minerals to form a barrier is generated by flooding barium chloride from a first well and sodium sulphate from a second well to form a barium sulphate scale at the interface of the two floods as a barrier to fluid flow.

In other implementations, the two reactants can be flowed successively from a single well via top or bottom water to occlude water flow from top or bottom water for example. For example, injection at the top or bottom of the reservoir of a soluble sulphide rich solution from a first well and an appropriately chosen metal rich solution from a second well can form a wall of an insoluble metal sulphide mineral that can take part in a recovery process acting, for example, as a barrier element. The formation of an organic barrier can be also be realized by injecting gel-forming polymer solution and solutions that promote gel formation. The injections of the interacting solutions can be done either sequentially from the same well or simultaneously from different wells to control the desired location for the artificial barrier. Injection of water soluble carbonates in a first well and soluble acids in a second well can produce a front of carbon dioxide generation at defined locations within the reservoir.

Example 7

Micro-Organisms

In some implementations, prior to production from a heavy oil or bitumen reservoir, a water-borne preconditioning agent is introduced into the water film to promote a desired microbial activity and/or to demote undesired microbial activity. In some implementations, the preconditioning agent can be one or more microorganisms including bacteria, archaea, viruses, yeasts or fungi to name a few. In other implementations, the preconditioning agent can be a nutrient, e.g., phosphorus, potassium and nitrogen bearing salt solutions, to encourage microbial migration through the reservoir and increase microbial activity rates. In some implementations, the preconditioning agent can be selected to change the chemical properties of the oil or water zones to facilitate subsequent biological conversion of heavy oil into a natural gas, for example, methane, carbon dioxide or hydrogen. The natural gas can then be produced at the surface or used in the reservoir for pressure maintenance.

The preconditioning agent can be a nutrient or a modifier to promote or demote specific biological processes and can be injected into the mobile water film of a heavy oil or bitumen reservoir. Examples of such preconditioning agents include ammonium phosphate as a typical nutrient to promote biological activity and encourage migration of organisms towards the beneficially nutrient preconditioned reservoir zone. Examples of biological demotivational agents can include sodium molybdate (or other hexavalent cation) to inhibit sulphate-reducing bacteria and sodium chlorate to inhibit nitrate-reducing bacteria. Methanogens can be inhibited with bromoethane sulfonic acid, N-substituted derivatives of para amino benzoic acid and several other compounds.

In some implementations, a preconditioning flow of nutrients through a mobile water film can be used in a first zone of the reservoir to promote biological activity to generate gases, such as carbon dioxide and methane. A different preconditioning agent, e.g., bromoethane sulfonic acid, can be introduced into a second zone of the reservoir such that methanogenesis is demoted and hydrogen production is promoted in the second zone. Hydrogen produced in the second zone can be flushed to a production well by gases produced in the first zone. The above example is illustrative of the ability to modify different zones within the oil-rich zone differently using the techniques described herein.

In contrast to conventional microbial enhanced oil recovery (MEOR) techniques, which introduce microbes, nutrients and oxygen into highly water saturated zones using water flood techniques, the preconditioning agents are introduced into the mobile water film in an oil-rich zone of the reservoir. As a further significant difference, conventional MEOR is not effective in a heavy oil or bitumen reservoir. By contrast, the techniques described herein are directed to use in heavy oil and bitumen reservoirs. The techniques described herein can actually be used to move preconditioning agents through the mobile water film to precondition a reservoir before a conventional MEOR is undertaken, such that subsequent microbial activity in a specific zone or zones in the reservoir can be managed to promote or demote specific biological sub-processes. In one implementation, if the preconditioning effect of the preconditioning agent can modify the reservoir to conditions suitable for conventional MEOR, then conventional MEOR can be undertaken subsequent to the preconditioning.

Example 8

Promoting Hydrate Formation

In some implementations, the desired preconditioning effect is to promote hydrate formation in the reservoir pre-production. Although in conventional recovery processes, efforts are undertaken to avoid hydrate formation within the reservoir and/or wellbore, as is discussed further below, the preconditioning effect described herein can have the effect of enhancing oil recovery. In these implementations, the preconditioning agent is selected to promote hydrate formation.

Figure 9:
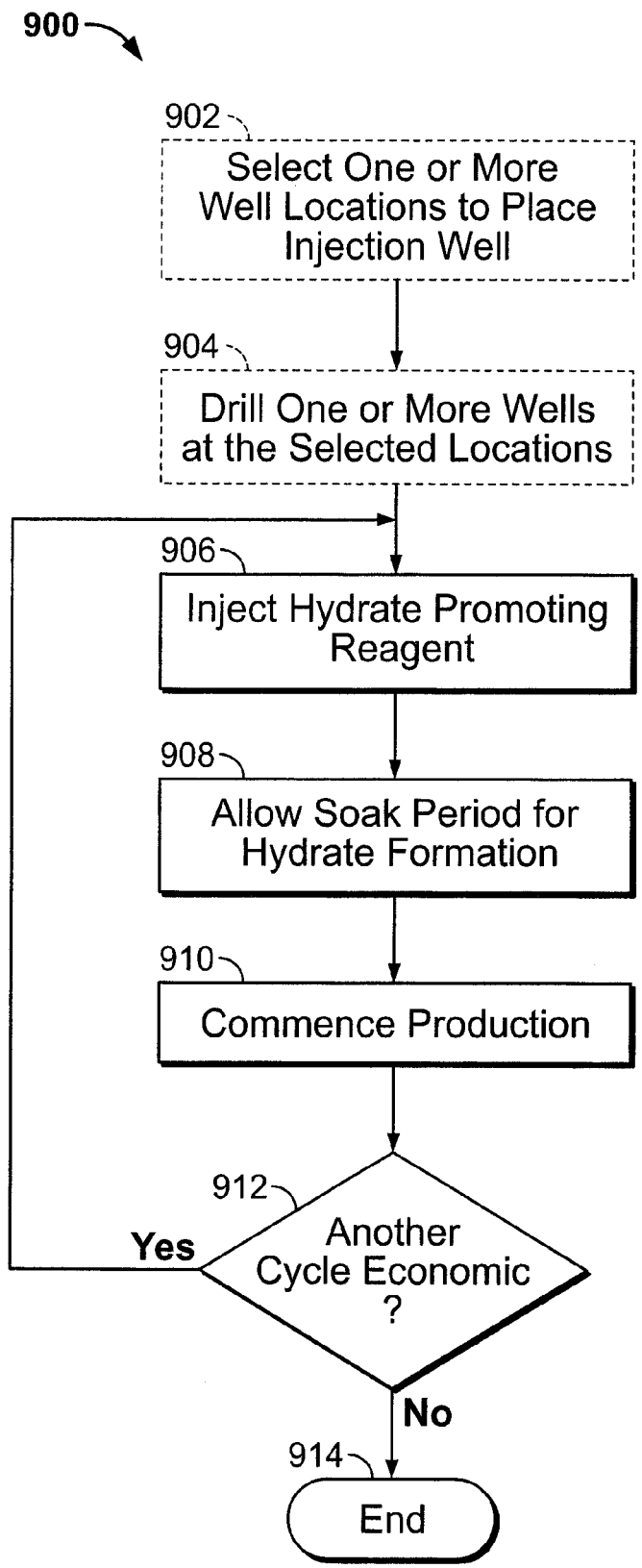
FIG. 9 is a flowchart showing a process for preconditioning a reservoir with a hydrate promoting agent.

Referring to FIG. 9, a flowchart shows a sample process for preconditioning an oil-rich zone with a hydrate promoting water-borne agent. Optionally one or more well locations to inject the preconditioning agent can be selected (Step 902) and drilled (Step 904). However, one or more existing wellbores can be used instead. The hydrate promoting water-borne agent is introduced into the mobile water film of the reservoir (Step 906). Optionally, the temperature of the water solution can be warmed to slightly above reservoir temperature such that the water solution is initially mobile within the water film. As the injected water solution cools and reservoir pressure increases (e.g., through either or both of active and passive pressurization), hydrates form in the water film. After sufficient water solution including the hydrate promoting agent is injected into the reservoir, the injection well is shut in and the reservoir is allowed to soak under conditions suitable for hydrate formation. During the soak period, the water solution and formation water form into frozen hydrates (Step 908).

Due to volume expansion effects, the creation of the hydrate phase can rearrange the reservoir matrix grains locally, thus loosening tightly bound oil and locally increasing permeability. After the soak period, the well is then switched onto production (Step 910) and the reservoir pressure is lowered significantly such that the hydrate decomposes. A pulse of solution gas will be produced and thus a pressure gradient, which together with the viscosity-reducing capabilities of the released gas, facilitate movement of oil toward the production well. After production decreases below an economic rate, if another injection-soak-production cycle is deemed economic ("Yes" branch of decision step 912), then the process can begin again at step 906.

As described above, the physical mechanisms of this process include: formation of hydrates; expansion of the hydrates leading to grain rearrangement and unlocking of tight oil and potentially enhanced porosity and permeability; gas evolution from hydrates leading to solution gas drive promoting the flow of oil to a production wellbore; and gravity drainage of mobilized oil toward the production wellbore. During the production stages, the pressure falls first closest to the wellbore and drops (evolving outwards) with time throughout the reservoir. In response, solution gas bubbles evolve at the innermost layer of hydrate in the proximity of the well, first motivating oil flow towards the production well. As the pressure drops radially outward, the solution gas evolves in this radial shell and helps move fluids toward the wellbore. Flow is not promoted outwards away from the wellbore, because there are frozen hydrates and nearly immobile bitumen beyond the radial shell, which only becomes mobilized after a pressure reduction wave moves through the reservoir.

Advantageously, the process can be undertaken with a single well, although multiple wells can be used. The single well can be used to inject the preconditioning agent mixture during the injection period and to produce the reservoir fluids during the production period.

In some implementations, the temperature of the hydrate-frozen region can be raised by injecting a heated fluid, thereby promoting decomposition of the hydrate during the production. In other implementations, a chemical agent, e.g., methanol, can be injected into the reservoir to promote decomposition of the hydrate. After the production rate drops to an uneconomic value, a water-borne hydrate promoting agent, of the same or a different composition, can again be injected into the reservoir until a target pressure is reached, optionally allowed to soak to cause the re-formation of hydrates after which the well is again put on production as the pressure is lowered. In one implementation of the process, there is no soak period. That is, after injection, the well is switched directly into production mode.

In some implementations, the preconditioning agent mixture is selected based on one or more of the following: formation water saturation, salinity and composition and ambient temperature and pressure of the reservoir. The preconditioning agent mixture can also be selected to promote hydrate formation in the reservoir and a reduced viscosity oil phase and/or to promote phase separation of the heavy oil in the reservoir and promotion of production of a mobile oil phase.

In some implementations, the process can be optimized for reservoirs that contain heterogeneous graded oil and water inventories, such that variable water salinity, for example, does not prevent systematic and pervasive hydrate formation. Optimization of solvent injection sequences and locations can be performed by using reservoir simulation tools.

The selected preconditioning agent can include any appropriate gas mixture that produces hydrates at reservoir conditions. Suitable preconditioning agents include, but are not limited to, mixtures of methane, ethane, propane, normal or iso-butane and carbon dioxide and water. In other implementations, salts or other additives can be added to the injected preconditioning agent to further control hydrate forming conditions and permit migration of the hydrate forming solution further into the formation before hydrates form.

In another implementation, higher molecular weight organic molecules can be included in the preconditioning agent to control phase behavior. For example, particular hydrocarbon and non-hydrocarbon mixtures can be included in the preconditioning agent to promote selective phase behaviour of the hydrates and heavy oil in the reservoir that promote production of the oil phase. This can involve promoting the formation of multiple oil-solvent liquid phases for production of the most mobile phase. In another example, methane, ethane, propane or carbon dioxide together with hydrate inhibitors such as alkyl ketones (e.g., MPK) or higher alcohols (e.g., butanol or pentanol) can be added to the aqueous preconditioning agent mixture in appropriate proportions, such that these higher molecular weight components, over time, will partition into the oil in the formation leaving a hydrate prone gas/water mixture within the water phase, which then forms hydrates while the oil viscosity is simultaneously reduced through solvent uptake. In some implementations, the preconditioning agent is mixed with any one of or a combination of one or more alcohol fatty acid esters or other thermally responsive chemicals. The combination can initially prevent hydrate forming behaviour and, after hydrolysis of these additives to oil-soluble alcohols and acids in the reservoir, promote hydrate formation after the hydrophobic molecules from the hydrolysis reactions partition into the oil phase, thereby leaving a more hydrate prone mixture in the water phase.

For example, addition of alkyl or aryl esters formed from non-halogenated or halogenated derivatives of acetic, formic, propionic acid or higher homologous carboxylic acids can be injected into the formation with the preconditioning agent. These components initially prevent hydrate formation. However, during the soak period the components will, under reservoir conditions, hydrolyse to free acids and alcohols at hydrolysis rates set by the substituent groups and reservoir temperature and water chemistry. The alcohols and acids formed partition into the oil phase and hydrate formation ensues. With the low molecular weight acids such as acetic acid, partition of the produced acid into the oil is not effective, but reaction with carbonate minerals removes the acids from the water producing carbon dioxide to promote hydrate formation. Ester hydrolysis rates can be selected based on degree and type of acid halogenation and the nature of the ester forming components.

To maintain a solvent vapour phase in the near wellbore region, the preconditioning agents can be heated slightly to prevent hydrates from forming in the near wellbore region, as a slight increase in temperature of the injectant, in the order of 0 to 15° C. (preferably 2 to 5° C.), can substantially increase the pressure at which hydrates form. The process can thereby be readily controlled by injectant temperature. In later cycles, where a depletion chamber exists, the temperature of the heated solvent mixture can be controlled so that it has sufficient heat to prevent hydrate formation in the near wellbore region, yet cools on flow to the chamber edges so that hydrates readily form at the chamber edges and in the mobile water film beyond the chamber edge.

The primary application of the process described is in reservoirs with mobile water film or reservoirs that have water injectivity and are at appropriate pressures and temperatures to form hydrates. Some heavy oil and bitumen reservoirs have mobile water film in oil-rich zones, as previously discussed.

By way of an illustrative example, consider a heavy oil sands reservoir at 1000 kPa and 10° C. If a preconditioning agent mixture of 0.88 mole fraction methane and 0.12 mole fraction propane in a water solution is injected into the reservoir with a mobile water film, the reservoir responds with a pressure increase. After sufficient injection, the pressure rises in a region around the injection well and given the composition of the injected preconditioning agent gas, hydrates form at just above 1600 kPa. Accordingly, there is a zone around the injection well where hydrates form. Once the hydrates form, and especially if the preconditioning agent gas/water solution injection becomes difficult, the well is switched onto production and the bottom-hole pressure is reduced lower than the hydrate onset pressure at the temperature of the reservoir. As a result, the hydrate will decompose, solution gas bubbles form, and the oil phase is mobilized towards the production well. Under optimal conditions dilution of the oil with excess propane and with potential asphaltene precipitation decreases oil viscosity further assisting flow of oil to a production well.

The techniques described above to promote hydrate formation can inject the preconditioning agent into the reservoir by way of a low pressure water flood, as previously discussed. However, in other implementations, where the preconditioning agent is a gas or gas mixture, the preconditioning agent gas can be injected as gas into the reservoir, where the gas will displace the most mobile phase, i.e., the mobile water film. Generally, the entire water film is not displaced and the gas together with the water film creates a two-phase flow in a region previously occupied by the water film. The gas injection can be followed with a water injection, that then displaces the gas in the film space and fills the space with water. In other implementations, the preconditioning agent is injected as a combined foamy gas/water flood.

Other Examples

The following are other examples of preconditioning agents that can be injected into the mobile water film of an oil-rich zone of a heavy oil or bitumen reservoir. The type of preconditioning sought to be achieved is described, as well as the type of preconditioning agent that can be used, and some example preconditioning agents for illustrative purposes.

Permeability Altering Agent

In some implementations, the water-borne preconditioning agent is a permeability altering agent to alter the permeability of the reservoir as a preconditioning step before oil production. For example, an acid, such as aqueous hydrochloric acid, or a complexing agent, such as EDTA, can be used to promote carbonate dissolution. These preconditioning agents dissolve minerals such as carbonates and open pore throats to increase permeability, so that fluid flow is increased during petroleum production. Any increase in permeability is favorable under cold or thermal recovery. Increasing reservoir permeability into the Darcy range is preferred so that oil and gas flow rates during production are increased.

In some implementations, the preconditioning agents are dolomitization or de-dolomitization agents. Examples of de-dolomitization preconditioning agents include chelating agents, such as citric, tartaric, malonic, oxalic and other acids that can attack dolomite and develop high permeability routes in the reservoir. Alternatively it may be desirable to reduce permeability in specific regions of the reservoir to control water. In this case to precipitate carbonates and attenuate permeability, the water-borne preconditioning agent can include a calcium or barium rich fluid and separately injected carbon dioxide or sodium carbonate solution.

Clay Mineral Stabilization or Swelling Agent

In some implementations, the water-borne preconditioning agent can be a clay mineral stabilizing agents or alternatively a clay mineral swelling agent. Clay mineral stabilizing agents can be used to restrict fines migration in clay rich reservoirs, e.g., in parts of the Peace River oil sands, to prevent pore blocking during production and to maintain a high reservoir permeability. There are many examples of commercial clay stabilization agents that can be used, for example, a preconditioning agent prepared by polymerizing diallyl-dimethyl-ammonium chloride with sulfur dioxide. When dissolved in an aqueous carrier fluid, the copolymer can be effective in preventing clay swelling and/or fines migration. In another example, a low molecular weight carboxylic acid, such as citric acid, can be effective to restrict clay mobility.

This has application to surface mining of oil sands reservoirs in that preconditioning of oil sand mine ore samples can reduce clay mobility during subsequent surface processing. Thus mineable oil sand resources can also benefit from such preconditioning water film floods of oil sands, via the exploration and observation boreholes, prior to mining activity and surface processing to separate the bitumen from the sand. This aids in subsequent fines control issues related to settling of fines in oil sands tailing ponds. Other modifications can also be made to improve the efficiency of the physical process separating bitumen and sand by flooding the appropriate preconditioning agent into the oil sand ore before it is mined.

In another implementation, a water-borne preconditioning agent to promote clay swelling in clay containing reservoirs can be used to reduce reservoir permeability. Some water soluble nonionic surfactants such as polyoxyethylene sorbitan monooleate can behave in this manner. Clay swelling can be promoted to reduce permeability in reservoir regions where flow is ideally retarded, for example, in regions adjacent to top, bottom or middle water zones, to reduce the impact of these water zones on recovery processes. In these cases the preconditioning agent flood can be administered via the top or bottom water zones, or via the mobile water film.

Gas Hydrate Preventing Components

In one implementation, the desired preconditioning effect is to prevent gas hydrate formation in the reservoir. In this implementation, the water-borne agent introduced into the mobile water film can be methanol or another very water soluble alcohol or glycol that does not partition effectively into an oil phase. These agents are hydrate inhibitors. The preconditioning agent is preferably introduced prior to attempting a VAPEX or solvent assisted thermal recovery techniques.

Some major issues faced by a conventional VAPEX technique include: the formation of hydrates in the reservoir and wellbore; difficulties establishing initial communication between the injection and production wells; and asphaltene plugging of the pore space in the reservoir. Results from field-scale VAPEX pilots indicate that the process suffers from hydrate issues and very low bitumen recovery.

VAPEX solvents typically consist of a mixture of methane and propane. The key solvent is propane, which when mixed with bitumen reduces its viscosity via not only dilution but also partial asphaltene precipitation. The methane is added to reduce the partial pressure of propane so as to reduce the concentration of propane in the oil phase to prevent precipitation of asphaltene because aggregates of asphaltene particles can potentially block pores and lower the permeability of the formation. If a well defined solvent chamber is not created in the reservoir, then there is no opportunity for gravity drainage of oil down the edges of the chamber and VAPEX does not produce oil from the reservoir. Generally, there is a high likelihood of hydrate formation in the reservoir, which ideally is avoided.

Various well stimulation technologies have been attempted in the past in which solvents have been injected into hydrocarbon reservoirs to prevent or decompose hydrates. For example, a cyclic solvent process for in situ bitumen and heavy oil production has been employed wherein a viscosity reducing solvent is injected into the reservoir under pressure. In other known well stimulation techniques, a defoaming agent, demulsifying agent, stabilizing agent or emulsifying agent is injected into the reservoir through the wellbore. These processes are directed to well stimulation in and around the wellbore and are not large scale reservoir preconditioning processes as described herein which precondition the reservoir over interwell distances of up to hundreds of meters. Further, the technologies are generally only useful in conjunction with steam injection methods and hence not for VAPEX, and have not been shown to prevent hydrate formation during VAPEX.

Agents to Mechanically Alter the Reservoir

In other implementations, the desired preconditioning effect is to corrode and weaken silicate grains or to attack carbonates, thereby reducing the energy necessary for fracturing during CSS or other recovery processes. In these implementations, the water-borne preconditioning agent can be a corrosive agent, e.g., an aqueous sodium hydroxide solution which will etch silicates, or a strong acid that can attack carbonates.

Alternatively, addition of a sodium silicate solution water film flood prior to a thermal recovery process can, during thermal recovery promote silicate formation and strengthening of the reservoir or result in pore blocking which can be used as a permeability reduction strategy to control water flow.

Stable Injectants

In other implementations, the water-borne preconditioning agent can be esters of carboxylic acids or of halogenated carboxylic acids, that have significant water solubility and that hydrolyze out in the reservoir under mild thermal conditions at natural reservoir temperatures over periods of days to months. The preconditioning agents thereby provide oil soluble alcohols that can act as viscosity reducing solvents for cold production recovery, and leave a carboxylic acid that can be a carbon dioxide generator during a subsequent thermal recovery process. In one example, the preconditioning agent is a citric acid ester.

A second class of preconditioning agents can be those that are produced by thermal decomposition of an injection stable precursor under thermal recovery. For example, oxalic acid produces carbon dioxide under SAGD conditions. Other preconditioning agents can be used to decompose thermally under thermal recovery conditions to produce solid transition metal oxide phases for example, which can act to block pores, form barriers or act as reactants in the reservoir. Examples include transition metal oxides formed by thermal decomposition by a thermal recovery heat front of water soluble transition metal salts. Examples of water soluble transition salts include transition metal carboxylate salts of ferric iron, such as iron lactate, iron tartrate or iron citrate, which decompose under SAGD conditions to give iron oxides.

In other implementations, a third class of compounds includes preconditioning agents that can react with crude oil, the formation water, or the reservoir minerals to form one component of a reaction system that produces an active preconditioning agent in the reservoir. An example would be introduction of a water soluble sulphate (e.g., potassium sulphate) solution, which at thermal recovery conditions of approximately 200° C. is well known to undergo thermochemical sulphate reduction (TSR) by reacting with hydrocarbons to produce sulphide ions through reaction with heavy oil. The sulphide ions formed can precipitate a metal sulphide if an appropriate metal ion containing solution has been injected. Solid metal sulphide phases can act to block pores, form barriers or act as reactants in the reservoir for a recovery process.

Preconditioning Agents to Change Electrical, Seismic or Magnetic Properties of the Reservoir In some implementations, the desired preconditioning effect is to enable the use of surface or borehole magnetometry to achieve improved geophysical resolution of the reservoir or accurate well drilling navigation. In such implementations, the water-borne preconditioning agent can be have magnetic properties, and examples include magnetite nanoparticles, such as nano magnetite or magnetite, complexed with multidentate carboxylic acids or other complexing agents to ensure water solubility. Magnetic fields could be used to aid directed flow of preconditioning agents and water in the reservoir. Surface magnetometry can be used to assess the position of a steam chamber through thermal alteration of the reservoirs magnetic field.

In some implementations, the preconditioning agent is selected to modify electrical properties of the reservoir. For example, the preconditioning agent can be saline water (e.g., sodium chloride dissolved in water) to increase electrical conductivity of the reservoir to enable electromagnetic heating of the reservoir to improve oil recovery in a thermal process. Alternatively, conductivity changes can be used as a logging tool to more accurately assess reservoir shape and steam chamber location using surface electromagnetic or conductivity based logging tools.

In other implementations, the preconditioning agent is selected to modify seismic properties of the reservoir. In one example, the preconditioning agent is a zinc bromide water solution of high density and can locally modify the density properties of a reservoir and thereby modify a seismic signal in a way that enables more accurate use of seismic to monitor reservoirs during production.

Steam Chamber or Production Allocation Tracking

In one implementation, the preconditioning agent can be selected to provide a steam chamber tracking tracer flood. By adding specific salts to a reservoir in predefined positions, the composition of the produced water can be used to assess, by analysis of the produced water, the location of a steam chamber during a thermal recovery process, or to assess where production is occurring along a wellbore. Therefore by preconditioning the reservoir with a preconditioning agent that is such a salt, e.g., potassium chloride, that is introduced into the mobile water film toward the toe of a SAGD well pair, or cold production horizontal well, and by introducing a different preconditioning agent, e.g., a sodium bromide solution, near the heel of the well, tracing can be achieved through analysis of produced water composition, to determine where production is occurring into a well bore and where in a thermal recovery operation the steam chamber is active.

Preconditioning Agents to Promote Reactions of Reservoir and Injected Fluids

In some implementations, the preconditioning effect involves injection of a component that only becomes active once it reacts with a reservoir fluid, typically oil. For example, the water-borne preconditioning agent can be a water soluble sulphate (e.g., potassium sulphate) and can be injected to make sulphides in the reservoir by reaction of hydrocarbons and sulphate at high temperature by the well documented process of thermochemical sulphate reduction or TSR (i.e., greater than approximately 140° C.) in a thermal recovery process. This sulphide can be used to react with metal ions, also injected into the reservoir, to produce metal sulphides that can have beneficial effects as part of a recovery process, or can form hydrogen sulphide, which can enliven any oil being produced and hence improve recovery.

Preconditioning Agents to Promote Carbon Dioxide Sequestration

The preconditioning agent can be selected to promote carbon dioxide sequestration by promotion of reactions of carbon dioxide with carbonates or silicates. Permanent sequestration of carbon dioxide can necessitate precipitation of low solubility phases such as calcite. This is usually limited by calcium availability in reservoirs. The water-borne preconditioning agent can be a calcium-rich brine, e.g., a calcium chloride solution.

Re-Pressurizing Agents

In some implementations, the desired preconditioning effect is to re-pressurize a reservoir. The preconditioning agent can be a gas generating preconditioning agent, for example, a carboxylic acid such as citric or oxalic acid, or an explosive, e.g., nitramine or RDX (hexahydro-1,3,5-trinitro-1,3,5 triazine), which decomposes in the reservoir to generate oil enlivening and viscosity reducing gases, such as carbon dioxide, nitrogen, alkanes such as methane, ethane or propane, or hydrogen.

Preconditioning Agents to Create Neo-Generated Proppants

In some implementations, the desired preconditioning effect is to enhance fractures created through hydraulic fracturing in the reservoir. For example, in some recovery processes, such as CSS, or in production of heavy oil and bitumen from fractured reservoirs such as the carbonate Devonian Grosmont formation of Alberta, enhancement of fracture permeability is advantageous. In these implementations, the preconditioning agent can be a propping agent, such as a mineral grain or viscous binder. The water-borne preconditioning agent is introduced via the mobile water film into natural or created fractures. In one example, the reservoir is preconditioned with a water soluble phosphate ester, and then with a successive flood including an aluminum compound to form the aluminum salt of the phosphate ester. This results in a gelling, and if subsequently hydraulic fracturing of the reservoir is initiated, then more efficiently propped fractures can result.

Emplacement of Demulsifying Agents in a Pre-Production Reservoir

In some implementations, it is desired to precondition the reservoir with a demulsification agent to reduce or eliminate costly oil-water emulsion formation during heavy oil or bitumen production. In these implementations, the preconditioning agent can be water soluble polyoxyalkylene based compounds or water soluble alcohols. Examples of demulsifier chemicals in the literature are numerous and include: alkyl phenols, ethoxylated alkyl phenol, polyoxyalkylated alkyl phenol resin, polyalkyl resins, alkyl phenol resins, alkyl phenol-aldehyde resins, alkoxylated alkyl phenol-aldehyde resins, polyoxylated alkyl phenol-aldehyde condensates, oligoamine alkoxylates, alkoxylated carboxylic acid esters, ethoxylated alcohols, copolymers of acrylates-surfactants, copolymers of acrylates-resins, copolymers of acrylates-alkyl aromatic amines, copolymers of carboxylics-polyols, co- or terpolymers of alkoxylated acrylates or methacrylates with vinyl compounds, condensates of mono- or oligoamine alkoxylates, dicarboxylic acids and alkylene oxide block copolymers, water soluble alkyl sulfates, alkyl sulphonates, alkyl aromatic sulphonates, ethoxylated alkyl sulphonates, alkyl phosphonates, alkyl quaternary amines, alkyl amine oxides, oxyalkylated polyalkylene polyamines, polyalkylene glycols, polyalkylene glycol ethers, alkyl acrylates, polyacrylates, alkyl acrylamides, alkyl amino alkyl acrylamides, polyacrylamides or blends of various demulsifier substances. Further, certain chemicals are known to enhance the performance of demulsifiers. Various demulsifier enhancers exist such as alcohols, aromatic, carboxylic acids, amino carboxylic acids, bisulphites, hydroxides, sulfates, phosphates, polyols, and mixtures thereof. As discussed herein, inexpensive carboxylic acids such as citric and oxalic acid have many beneficial preconditioning effects for bitumen and heavy oil reservoirs.

In other implementations, this same approach can be used to precondition the reservoir with corrosion or scale inhibitors, wax inhibitors or other agents that prevent fouling problems. Emplacement of the preconditioning agents before production can greatly increase their efficiency.

Preconditioning Agents to Promote or Demote In Situ Combustion within Different Zones In some implementations, the desired preconditioning effect is to isolate a top or bottom water zone, or to define a chamber within a reservoir, to facilitate in situ combustion. In situ combustion is conventionally used as part of some heavy oil and bitumen recovery processes. Air or oxygen is injected into a heated reservoir and oil spontaneously combusts producing heat and gases to promote displacement of oil to a production well. Control of the fire front is important and in some processes such as the THAI process (the toe-to-heel in situ combustion process employing horizontal production wells) a layer of coke formation and incomplete combustion is preferred to provide a barrier to air flow to a production well.

In one implementation, a barrier to in situ combustion can be facilitated by introducing a water solution into the mobile water film that includes as a preconditioning agent water soluble fire retardants, e.g., ammonium phosphate, ammonium sulphamate, sodium silicate, sodium borate, boric acid, brominated phenol or other water soluble brominated or halogenated organic compounds.

In some implementations, the preconditioning agent can be selected to accelerate in situ combustion in a zone in which acceleration is desired. In these implementations, the preconditioning agent can be water soluble oxidants, e.g., an alkali metal chlorate, perchlorate or a peroxide. This can help to prevent pore blocking partial oxidation of the oil to form coke when air supply is limited. Such preconditioning of the reservoir enables more directed control of the firefront.

In some implementations, the reservoir can be preconditioned in layers (i.e., zones within the oil-rich zone). That is, a first layer can be flooded with a preconditioning agent to promote effective combustion, and a second layer can be flooded with a preconditioning agent to promote coke formation and incomplete combustion.

Waste Disposal In Situ

The waters films in bitumen and heavy oil reservoirs provide a large volume chemically reducing environment able to safely act as a repository for many toxic chemicals. With viscous oil present the viscous oil can act as a partitioning receptor for organic species injected into the mobile water film. The reservoir can thereby behave as a waste disposal tank, where pollutants are sequestered into the immobile oil phase by introducing the pollutants into the mobile water film by low pressure water flood. Examples of pollutants include oil contaminated water or generic waste water.

Many radionuclides from the nuclear industry are mobile under oxidized conditions but are immobile when reduced. Some radionuclides such as technetium are difficult to immobilize in solid form as they are very water soluble. Viscous oil containing reservoirs are good places to store initially water soluble radioactive waste, as they are sealed on geological timescales; they are reducing environments enabling immobilization of radionuclides as water insoluble reduced forms after injection and in bitumen reservoirs they have reduced fluid mobility under native reservoir conditions.

Several different implementations of the techniques for enhancing recovery of heavy oil or bitumen have been described. The common feature is the use of mobile water film within a heavy oil or bitumen reservoir as a mechanism to transport a preconditioning agent or agents to a particular region or regions in the reservoir to provide a desired preconditioning effect. Once the reservoir has been preconditioned with the preconditioning agent, production can commence. Production may be to produce previously unrecoverable heavy oil and bitumen. In other implementations, production is to produce a petroleum product generated in situ by conversion from the heavy oil or bitumen using the preconditioning agent, for example, the production of a natural gas such as methane or hydrogen via a biological upgrading process.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise.

A number of implementations have been described. Nevertheless, it will be understood that various modifications may be made without departing from the spirit and scope of the invention. Accordingly, other implementations are within the scope of this application.

The invention claimed is:

1. A method for enhancing recovery of a petroleum product from an oilfield reservoir comprising:
   injecting water including a preconditioning agent into a mobile water film included in the oilfield reservoir, where the oilfield reservoir includes at least one of heavy oil or bitumen; and
   preconditioning the oilfield reservoir with the preconditioning agent prior to production of the petroleum product from the oilfield reservoir,
   wherein preconditioning the oilfield reservoir comprises allowing the preconditioning agent a defined period of time to permeate and react within an oil-rich zone in the oilfield reservoir prior to production of the petroleum product from the oilfield reservoir, the defined period of time determined based on at least one of a type of the preconditioning agent, one or more reservoir characteristics, or a desired preconditioning effect on the oilfield reservoir.

2. The method of claim 1, wherein the mobile water film is included in the oil-rich zone in the reservoir.

3. The method of claim 1, wherein the water including the preconditioning agent is injected at a pressure low enough that the heavy oil or bitumen is substantially unmoved by the injected water.

4. The method of claim 1, wherein the water including the preconditioning agent is injected at a first location through a first well, the method further comprising:
   producing water from the oilfield reservoir at a second location from a second well to urge movement of the preconditioning agent in a direction from the first location toward the second location.

5. The method of claim 1, further comprising:
   after preconditioning the reservoir, recovering the petroleum product from the reservoir by using cold production.

6. The method of claim 1, further comprising:
   after preconditioning the reservoir, recovering the petroleum product from the reservoir by using a thermal recovery process.

7. The method of claim 1, wherein preconditioning the oilfield reservoir comprises modifying the viscosity of a fluid in the reservoir.

8. The method of claim 7, wherein the preconditioning agent comprises an organic solvent having moderate water solubility.

9. The method of claim 7, wherein the preconditioning agent is selected from a group consisting of: methyl ethyl ketone, methyl propyl ketone and methyl tertiary-butyl ether.

10. The method of claim 7, wherein modifying the viscosity of a fluid in the reservoir comprises enlivening the heavy oil or bitumen with solution gas.

11. The method of claim 10, wherein the preconditioning agent comprises a water soluble agent that decomposes under recovery process conditions to produce a gas.

12. The method of claim 10, wherein the preconditioning agent comprises citric acid.

13. The method of claim 10, wherein the preconditioning agent comprises oxalic acid.

14. The method of claim 10, wherein the preconditioning agent comprises a carboxylic acid.

15. The method of claim 10, wherein the recovery process conditions comprises thermal recovery conditions.

16. The method of claim 10, wherein injecting water including a preconditioning agent comprises:
   injecting a first water solution including a carboxylic acid; and
   injecting a second water solution including a water soluble carbonate mineral.

17. The method of claim 1, wherein preconditioning the oilfield reservoir comprises creating a barrier layer within the reservoir.

18. The method of claim 17, wherein the barrier layer comprises a highly viscous oil barrier layer situated to restrict an interface between the oil-rich zone and a water zone.

19. The method of claim 17, wherein the preconditioning agent comprises an alkylphenol agent selected to promote change in reservoir wettability.

20. The method of claim 17, wherein the preconditioning agent comprises metal ions or a multidentate ligand organic compound selected to facilitate binding of non-hydrocarbons.

21. The method of claim 17, wherein the preconditioning agent comprises a soluble calcium salt selected to form insoluble calcium naphthenates with oil in the reservoir.

22. The method of claim 1, wherein preconditioning the oilfield reservoir comprises modifying the wettability of the reservoir from a water wet to an oil wet reservoir.

23. The method of claim 22, wherein the preconditioning agent comprises a water soluble agent that can sorb to a mineral surface by a functional group.

24. The method of claim 22, wherein the preconditioning agent comprises a water soluble agent including a hydrophobic component that can rupture a mineral bound water film.

25. The method of claim 22, wherein the preconditioning agent comprises a phenol.

26. The method of claim 1, wherein injecting water including a preconditioning agent into a mobile water film comprises:
   injecting a first water solution including a first preconditioning agent through a first well; and
   injecting a second water solution including a second preconditioning agent through a second well;
   wherein the first preconditioning agent reacts in situ with the second preconditioning agent to create a region of reactive component.

27. The method of claim 26, wherein:
the first preconditioning agent comprises a soluble sulphide rich solution;
the second preconditioning agent comprises a metal rich solution; and
the region of reactive component comprises a region of insoluble metal sulphide creating a barrier restricting fluid flow.

28. The method of claim 26, wherein:
the first preconditioning agent comprises a water soluble carbonate;
the second preconditioning agent comprises a soluble acid; and
the region of reactive component comprises carbon dioxide.

29. The method of claim 1, wherein preconditioning the oilfield reservoir comprises promoting or demoting a biological process.

30. The method of claim 1, wherein preconditioning the oilfield reservoir comprises inhibiting sulphate-reducing bacteria and the preconditioning agent comprises sodium molybdate.

31. The method of claim 1, wherein preconditioning the oilfield reservoir comprises inhibiting nitrate reducing bacteria and the preconditioning agent comprises sodium chlorate.

32. The method of claim 1, wherein preconditioning the oilfield reservoir comprises inhibiting methanogens and the preconditioning agent comprises bromoethane sulfonic acid.

33. The method of claim 1, wherein preconditioning the oilfield reservoir comprises promoting hydrate formation within the reservoir and the preconditioning agent comprises a hydrate promoting agent.

34. The method of claim 33, wherein the preconditioning agent is selected from a group consisting of: methane, ethane, propane, normal butane, iso-butane and carbon dioxide.

35. The method of claim 33, wherein the preconditioning agent further includes a hydrate inhibitor.

36. The method of claim 33, further comprising:
after a period expires during which hydrates form in the reservoir at a hydrate onset pressure, reducing pressure at a wellbore located in the reservoir to a pressure lower than the hydrate onset pressure such that the hydrates decompose and solution gas bubbles form.

37. The method of claim 33, further comprising:
heating the water including the preconditioning agent prior to injection.

38. The method of claim 1, wherein preconditioning the reservoir comprises altering the permeability of the reservoir.

39. The method of claim 38, wherein the preconditioning agent is selected to promote carbonate dissolution.

40. The method of claim 38, wherein the preconditioning agent is a dolomitization agent.

41. The method of claim 38, wherein the preconditioning agent is a de-dolomitization agent.

42. The method of claim 1, wherein preconditioning the reservoir comprises reducing permeability of the reservoir and the preconditioning agent comprises a clay mineral swelling agent.

43. The method of claim 1, wherein preconditioning the reservoir comprises increasing or maintaining permeability of the reservoir and the preconditioning agent comprises a clay mineral stabilizing agent.

44. The method of claim 1, wherein preconditioning the reservoir comprises preventing hydrate formation and the preconditioning agent comprises a hydrate inhibitor.

45. The method of claim 1, wherein preconditioning the reservoir comprises corroding silicate grains included in the reservoir and the preconditioning agent comprises a corrosive agent.

46. The method of claim 1, wherein the preconditioning agent comprises a sodium silicate solution selected to promote silicate formation under subsequent thermal recovery conditions and reduce permeability in a region of the reservoir to control water flow.

47. The method of claim 1, wherein preconditioning the reservoir comprises modifying a magnetic property of the reservoir and wherein the preconditioning agent has a magnetic property.

48. The method of claim 1, wherein preconditioning the reservoir comprises modifying an electrical property of the reservoir and the preconditioning agent comprises a saline solution selected to increase electrical conductivity of the reservoir.

49. The method of claim 1, wherein preconditioning the reservoir comprises modifying a seismic property of the reservoir.

50. The method of claim 1, further comprising, during a later process to recover the petroleum product:
producing water from the reservoir;
analyzing the produced water to determine whether or not the preconditioning agent is present; and
determining a location of a steam chamber based on the analysis.

51. The method of claim 1, further comprising, during a later process to recover the petroleum product:
producing water from the reservoir;
analyzing the produced water to determine whether or not the preconditioning agent is present; and
determining a location of production along a wellbore based on the analysis.

52. The method of claim 1, wherein preconditioning the reservoir comprises carbon dioxide sequestration and the preconditioning agent comprises a calcium-rich brine.

53. The method of claim 1, wherein preconditioning the reservoir comprises enhancing fracture permeability and the preconditioning agent comprises a propping agent.

54. The method of claim 1, wherein preconditioning the reservoir comprises reducing oil-water emulsion formation and the preconditioning agent comprises a demulsifying agent.

55. The method of claim 1, wherein preconditioning the reservoir comprises creating a barrier to in situ combustion and the preconditioning agent comprises a fire retardant.

56. The method of claim 1, wherein preconditioning the reservoir comprises accelerating in situ combustion and the preconditioning agent comprises an oxidant.

57. The method of claim 1, wherein the preconditioning agent decomposes thermally under subsequent thermal recovery conditions producing a secondary agent, where the secondary agent preconditions the reservoir.

58. The method of claim 57, wherein the preconditioning agent comprises oxalic acid that produces a secondary agent of carbon dioxide under steam assisted gravity drainage recovery conditions and wherein preconditioning the reservoir comprises enlivening the heavy oil or bitumen with the carbon dioxide.

59. The method of claim 57, wherein the preconditioning agent comprises a transition metal carboxylate salt of ferric iron that produces a secondary agent of iron oxide under steam assisted gravity drainage recovery conditions and wherein preconditioning the reservoir comprises forming one or more barrier regions within the reservoir.

60. The method of claim 1, wherein the preconditioning agent comprises a carboxylic acid and preconditioning the reservoir comprises reducing clay mobility, the method further comprising:
producing the petroleum product from the reservoir by surface mining.

61. A method for enhancing recovery of a petroleum product from an oilfield reservoir, comprising:
injecting a water solution including a preconditioning agent into a mobile water film included in the oilfield reservoir, where the oilfield reservoir includes at least one of heavy oil or bitumen;
allowing the preconditioning agent to react with one or more components in situ to produce a component of a reaction system from which an active secondary agent is derived;
preconditioning the oilfield reservoir with the active secondary agent prior to production of the petroleum product from the oilfield reservoir; and
allowing the active secondary agent a defined period of time to permeate and react within an oil-rich zone in the oilfield reservoir prior to production of the petroleum product from the oilfield reservoir, where the defined period of time is determined based on at least one of a type of the preconditioning agent, one or more reservoir characteristics, or a desired preconditioning effect on the oilfield reservoir.

62. The method of claim 61, wherein the water solution is injected into the oil-rich zone of the reservoir.

63. The method of claim 61, wherein:
the preconditioning agent comprises a water soluble sulphate;
allowing the preconditioning to react comprises allowing the water soluble sulphate to undergo thermochemical sulphate reduction by reacting with hydrocarbons included in the reservoir under thermal recovery conditions to produce a component comprising sulphide ions.

64. The method of claim 63, further comprising:
injecting a second water solution including metal ions into the mobile water film of the reservoir, where the metal ions react with the sulphide ions to produce an active secondary agent comprising a solid metal sulphide phase.

65. The method of claim 64, wherein preconditioning the oilfield reservoir with the active secondary agent comprises forming one or more barrier regions with the solid metal sulphide phase.

66. A system for recovering a petroleum product from a heavy oil or bitumen reservoir, comprising:
an injection well drilled to a depth located within an oil-rich zone of the heavy oil or bitumen reservoir;
a production well drilled to a lower depth than the injection well and located within the oil-rich zone of the heavy oil or bitumen reservoir;
a source of a water solution including a preconditioning agent, wherein the injection well is configured to inject the water solution into a mobile water film in the oil-rich zone such that the reservoir is preconditioned with the preconditioning agent prior to production of the petroleum product from the reservoir; and
a source of steam, wherein the injection well is configured to inject steam into the oil-rich zone to create steam assisted gravity drainage (SAGD) recovery conditions after the preconditioning and the production well is configured to produce the petroleum product under SAGD recovery conditions.

67. A method for enhancing recovery of a petroleum product from an oilfield reservoir comprising:
injecting a preconditioning agent into a mobile water film included in the oilfield reservoir, where the oilfield reservoir includes at least one of heavy oil or bitumen;
preconditioning the oilfield reservoir with the preconditioning agent prior to production of the petroleum product from the oilfield reservoir; and
allowing the preconditioning agent a defined period of time to permeate and react within an oil-rich zone in the oilfield reservoir prior to production of the petroleum product from the oilfield reservoir, where the defined period of time is determined based on at least one of a type of the preconditioning agent, one or more reservoir characteristics, or a desired preconditioning effect on the oilfield reservoir.

68. The method of claim 67, wherein the preconditioning agent is included in a carrier fluid.

69. The method of claim 68, wherein the carrier fluid is water.

70. The method of claim 67, wherein the preconditioning agent is injected into the oil-rich zone of the reservoir.

71. A method for preconditioning an oilfield reservoir, comprising:
providing a carrier fluid including a preconditioning agent into a mobile water film included in an oil-rich zone of the oilfield reservoir, where the oilfield reservoir includes at least one of heavy oil or bitumen;
distributing the preconditioning agent to the oilfield reservoir primarily through the mobile water film; and
preconditioning the oilfield reservoir with the preconditioning agent prior to production of a petroleum product from the oilfield reservoir,
wherein preconditioning the oilfield reservoir comprises allowing the preconditioning agent a defined period of time to permeate and react within the oil-rich zone prior to production of a petroleum product from the oilfield reservoir, the defined period of time determined based on at least one of a type of the preconditioning agent, one or more reservoir characteristics, or a desired preconditioning effect on the oilfield reservoir.

72. The method of claim 71, wherein the carrier fluid including the preconditioning agent is injected at a pressure low enough that the heavy oil or bitumen is substantially unmoved by the injected carrier fluid.

73. The method of claim 71, wherein the carrier fluid including the preconditioning agent is injected at a first location through a first well, the method further comprising:
producing water from the oilfield reservoir at a second location from a second well to urge movement of the preconditioning agent in the mobile water film in a direction from the first location toward the second location.

74. The method of claim 71, wherein preconditioning the oilfield reservoir comprises modifying the viscosity of a fluid in the reservoir.

75. The method of claim 74, wherein modifying the viscosity of a fluid in the reservoir comprises enlivening the heavy oil or bitumen with solution gas.

76. The method of claim 71, wherein preconditioning the oilfield reservoir comprises creating a barrier layer within the reservoir.

77. The method of claim 71, wherein preconditioning the oilfield reservoir comprises modifying the wettability of the reservoir.

78. The method of claim 71, wherein preconditioning the oilfield reservoir comprises altering the permeability of the reservoir.

79. The method of claim 71 wherein the carrier fluid is water.

80. The method of claim 71 where the preconditioning agent is a water soluble organic solvent.

81. A method comprising:
injecting water including a preconditioning agent at a first location into a mobile water zone situated adjacent an oil-rich zone of an oilfield reservoir, where the oilfield reservoir includes at least one of heavy oil or bitumen;
producing water from the oilfield reservoir at a second location to urge movement of the preconditioning agent into the oil-rich zone, where the preconditioning agent is distributed to the oil-rich zone primarily through a mobile water film; and
preconditioning the oilfield reservoir with the preconditioning agent prior to production of a petroleum product from the oilfield reservoir.

82. The method of claim 81 where the second location is in the oil-rich zone.

83. A method for enhancing recovery of a petroleum product from an oilfield reservoir comprising:
injecting water including a preconditioning agent into a mobile water film included in the oilfield reservoir, where the oilfield reservoir includes at least one of heavy oil or bitumen, and wherein the water including the preconditioning agent is injected at a first location through a first well;
preconditioning the oilfield reservoir with the preconditioning agent prior to production of the petroleum product from the oilfield reservoir; and
producing water from the oilfield reservoir at a second location from a second well to urge movement of the preconditioning agent in a direction from the first location toward the second location.

84. A method for enhancing recovery of a petroleum product from an oilfield reservoir comprising:
injecting water including a preconditioning agent into a mobile water film included in the oilfield reservoir, where the oilfield reservoir includes at least one of heavy oil or bitumen; and
preconditioning the oilfield reservoir with the preconditioning agent prior to production of the petroleum product from the oilfield reservoir, wherein preconditioning the oilfield reservoir comprises modifying the viscosity of a fluid in the reservoir, and
wherein the preconditioning agent is selected from a group consisting of: methyl ethyl ketone, methyl propyl ketone and methyl tertiary-butyl ether.

85. A method for enhancing recovery of a petroleum product from an oilfield reservoir comprising:
injecting water including a preconditioning agent into a mobile water film included in the oilfield reservoir, where the oilfield reservoir includes at least one of heavy oil or bitumen, wherein injecting water including a preconditioning agent comprises injecting a first water solution including a carboxylic acid, and injecting a second water solution including a water soluble carbonate mineral; and
preconditioning the oilfield reservoir with the preconditioning agent prior to production of the petroleum product from the oilfield reservoir, wherein preconditioning the oilfield reservoir comprises modifying the viscosity of a fluid in the reservoir, and
wherein modifying the viscosity of a fluid in the reservoir comprises enlivening the heavy oil or bitumen with solution gas.

86. A method for preconditioning an oilfield reservoir, comprising:
providing a carrier fluid including a preconditioning agent into a mobile water film included in an oil-rich zone of the oilfield reservoir, where the oilfield reservoir includes at least one of heavy oil or bitumen, and wherein the carrier fluid including the preconditioning agent is injected at a first location through a first well;
distributing the preconditioning agent to the oilfield reservoir primarily through the mobile water film;
preconditioning the oilfield reservoir with the preconditioning agent prior to production of a petroleum product from the oilfield reservoir; and
producing water from the oilfield reservoir at a second location from a second well to urge movement of the preconditioning agent in the mobile water film in a direction from the first location toward the second location.

87. A method for enhancing recovery of a petroleum product from an oilfield reservoir comprising:
injecting water including a preconditioning agent into a mobile water film included in the oilfield reservoir, where the oilfield reservoir includes at least one of heavy oil or bitumen; and
preconditioning the oilfield reservoir with the preconditioning agent prior to production of the petroleum product from the oilfield reservoir,
wherein the at least one of heavy oil or bitumen comprises a fluid having a viscosity between about 1,000 centipoise and 100,000,000 centipoise at surface conditions.

88. The method of claim 87, wherein the fluid has a viscosity between about 10,000 centipoise and 35,000,000 centipoise at surface conditions.

89. The method of claim 87, wherein the fluid has a viscosity between about 10,000 centipoise and 1,000,000 centipoise at surface conditions.

* * * * *